United States Patent [19]
Kitano et al.

[11] Patent Number: 5,583,772
[45] Date of Patent: Dec. 10, 1996

[54] EVALUATION AND CONTROL METHOD AND APPARATUS FOR VEHICLE OPERATION OF ANTISKID CONTROL DEVICE

[75] Inventors: Yutaka Kitano, Tokyo; Toshio Takayama; Masaru Sakuma, both of Yamanashi-ken, all of Japan

[73] Assignee: Tokico Ltd, Kanagawa-ken, Japan

[21] Appl. No.: 180,908

[22] Filed: Jan. 12, 1994

[30] Foreign Application Priority Data

Jan. 18, 1993 [JP] Japan .................................. 5-006272
Sep. 20, 1993 [JP] Japan .................................. 5-233906

[51] Int. Cl.$^6$ .................................................. B60T 8/32
[52] U.S. Cl. ................................. 364/426.015; 303/158; 364/424.034
[58] Field of Search ........................ 364/426.01, 426.02, 364/426.03, 565, 566; 180/197; 303/158, 163, 169, 156, 167

[56] References Cited

U.S. PATENT DOCUMENTS

| | | | |
|---|---|---|---|
| 4,825,371 | 4/1989 | Hoashi et al. | 364/426.02 |
| 4,989,165 | 1/1991 | Watanabe et al. | 364/565 |
| 5,058,020 | 10/1991 | Matsuda | 364/426.02 |
| 5,222,570 | 1/1993 | Kawamura et al. | 180/197 |
| 5,236,255 | 8/1993 | Kuwana et al. | 303/106 |
| 5,244,258 | 9/1993 | Van Zanten et al. | 303/100 |
| 5,257,857 | 11/1993 | Okazaki | 303/103 |
| 5,286,100 | 2/1994 | Takayama et al. | 303/111 |
| 5,329,453 | 7/1994 | Tsuyama et al. | 364/426.02 |

FOREIGN PATENT DOCUMENTS 106766  4/1984  Japan .

*Primary Examiner*—Michael Zanelli
*Attorney, Agent, or Firm*—Biebel & French

[57] ABSTRACT

The objective of the present invention is to present a reliable evaluation method for determining whether a moving vehicle is in a stable antiskid control operation or in an unstable antiskid control operation even when there are wheel speed pulsation caused, and a device based on such a method. In the antiskid control apparatuses and the methods of the invention, it is determined that the moving vehicle is in the stable control when the wheel acceleration being generated while the wheel speed is decreasing exceeds a predetermined threshold value, and also determined that the moving vehicle is in the unstable control when the wheel acceleration is below the threshold value. In another antiskid control apparatus and the method of the invention, it is determined that moving vehicle is in the unstable control or in the stable control basis on the changes in the wheel slipping rate with respect to the coefficient of friction between the wheel and a road.

10 Claims, 20 Drawing Sheets

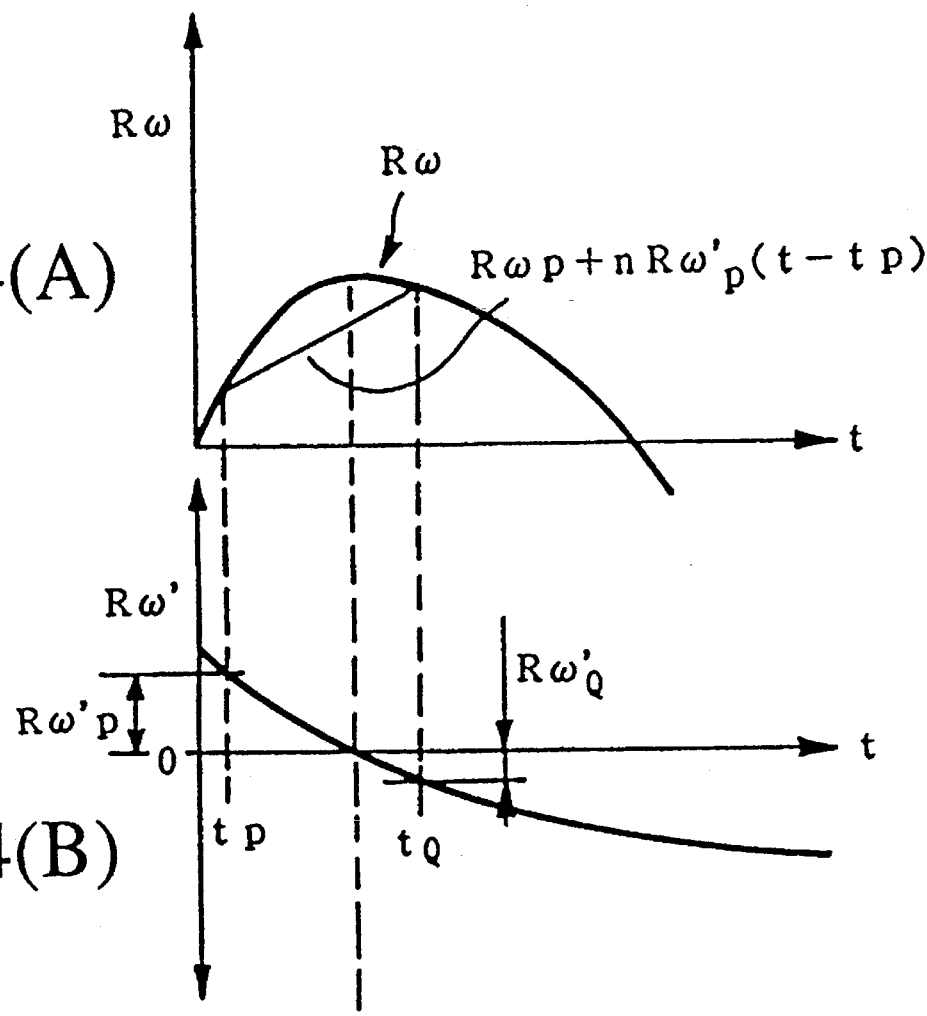
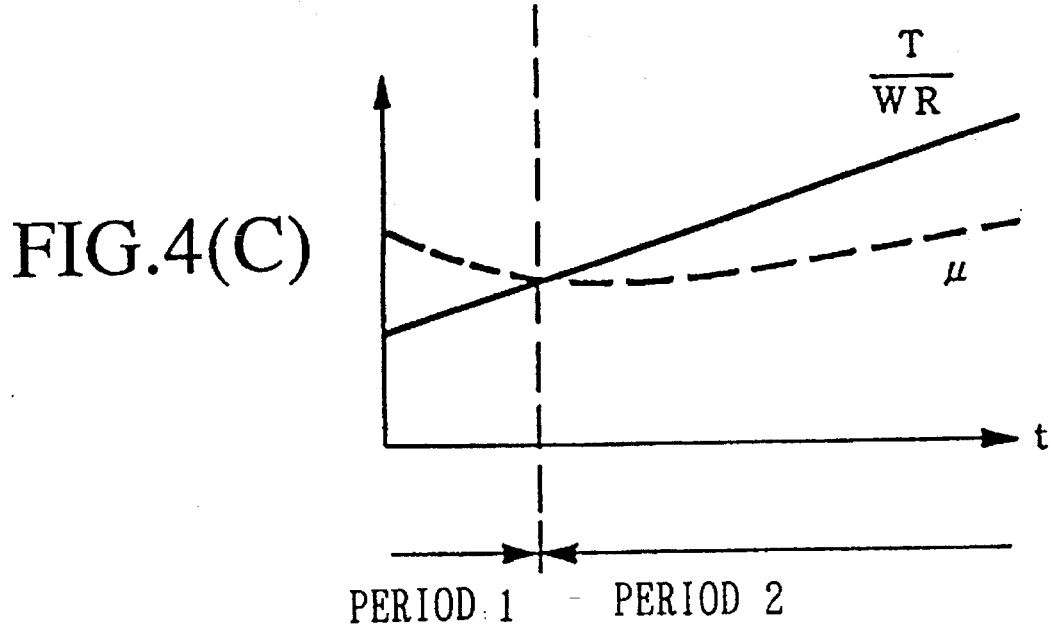
FIG.4(A)
FIG.4(B)
FIG.4(C)

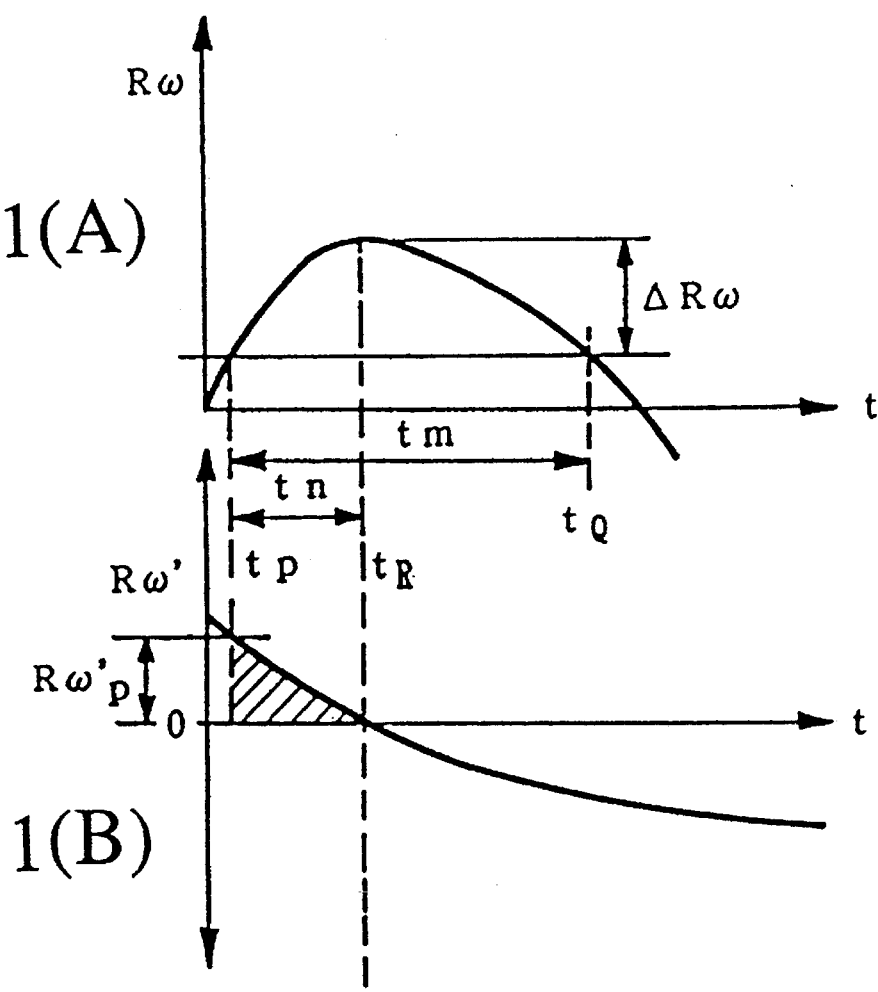
FIG.11(A)
FIG.11(B)
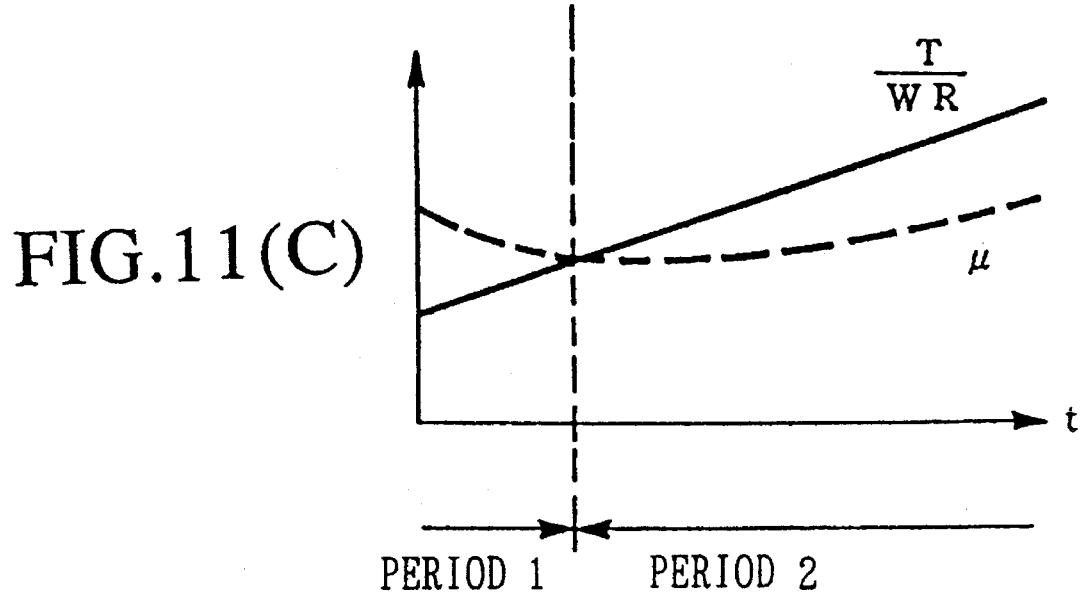
FIG.11(C)
PERIOD 1  PERIOD 2

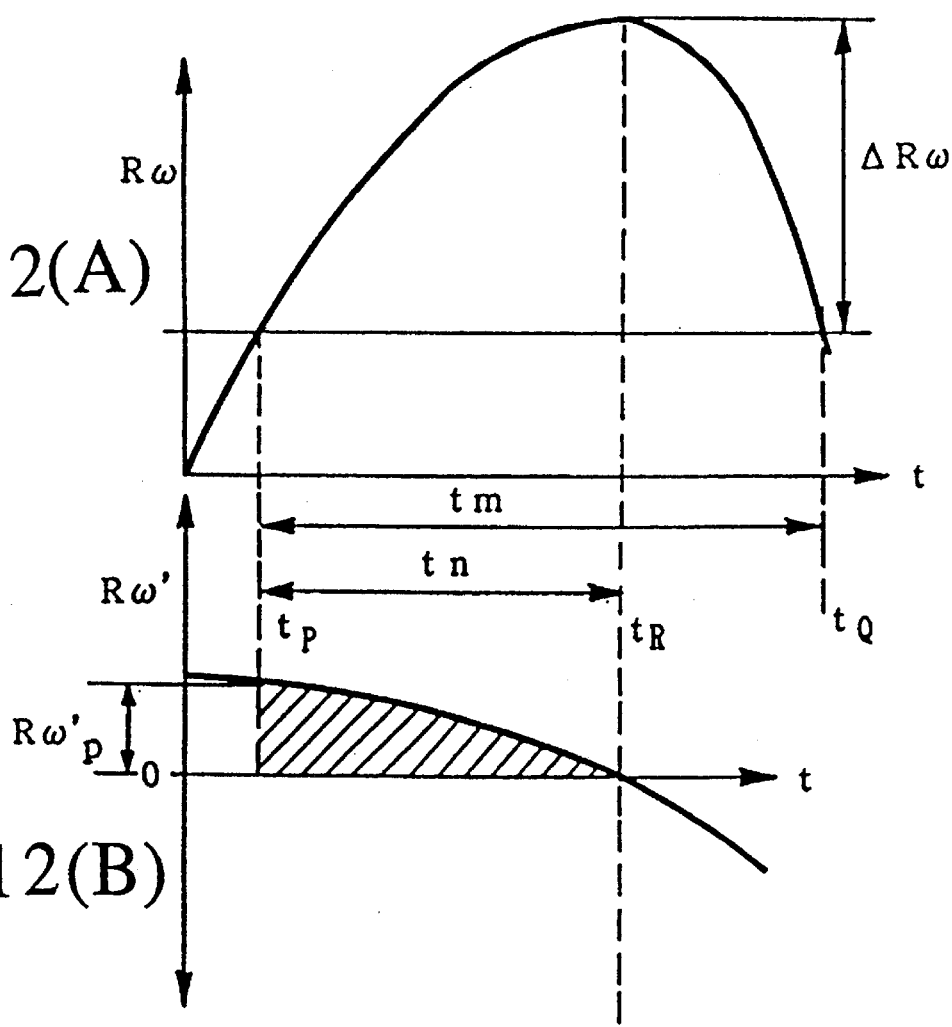
FIG.12(A)
FIG.12(B)
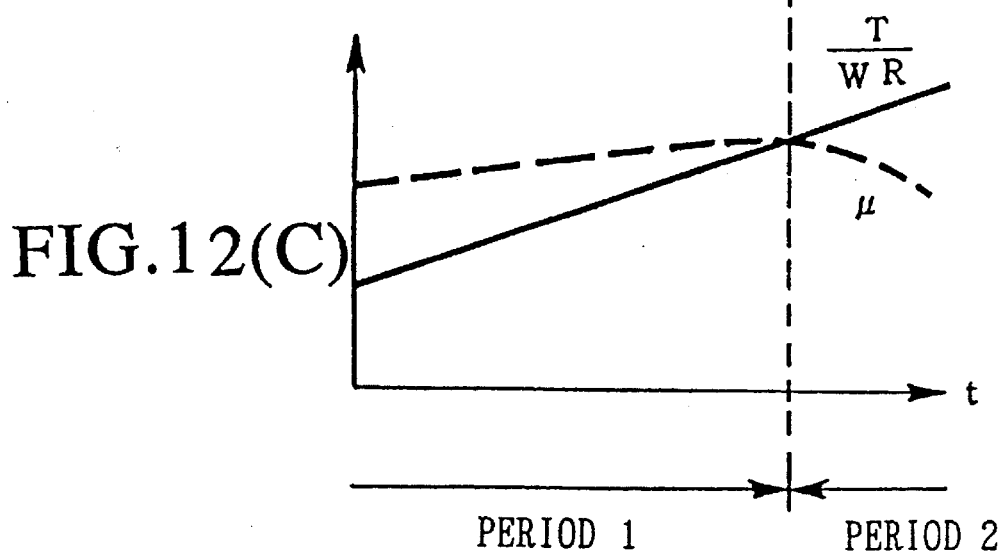
FIG.12(C)

EVALUATION AND CONTROL METHOD AND APPARATUS FOR VEHICLE OPERATION OF ANTISKID CONTROL DEVICE

BACKGROUND OF THE INVENTION

1. Field of the Invention

The present invention relates to a method and an apparatus for preventing a lock up of wheels on a moving vehicle, and a method and apparatus for evaluating the operating conditions of an antiskid control device for the moving vehicle.

2. Technical Background

The inventors of the present invention have presented an antiskid control device for preventing wheel lock up during the operation of a vehicle in a patent application (JPA, First Publication, H1-106766). This antiskid device is based on measurements of the accelerating/decelerating conditions of the wheels and their differentials, and decides whether the vehicle is in a stable antiskid control condition (i.e., generating a slipping condition which is lower than the maximum frictional condition for a road), or in an unstable operating condition (i.e., generating a slipping condition which is higher than the maximum frictional condition for the road).

However, the above antiskid device presented a problem that because the device judges the stability of the vehicle operation on the basis of the measured values of the wheel speeds and their differentials, if the wheel speed changes for some reason, caused by vibrations in the wheel due to road conditions for example, then measurement errors increased leading to erroneous judgement. Therefore, the existing antiskid control device and operating method needed improvement.

SUMMARY OF THE INVENTION

The purpose of the present invention is to present a reliable evaluation method for determining whether a moving vehicle is in a stable antiskid control operation or in an unstable antiskid control operation, and a device based on such a method.

Another objective of the present invention is to present a method for providing a reliable control over the wheel slipping rate even when there are wheel speed pulsations caused by factors external to the axial system by accurately calculating or estimating the slipping rate of the wheel.

To achieve the above objective, a method for evaluating the operating condition of an antiskid control operation of a moving vehicle is presented, wherein a wheel cylinder of said moving vehicle is subjected to a first reduction in the fluid pressure followed by a first increase in the fluid pressure such that the axial control torque inclusive of the brake torque is being increased linearly with time, based on whether: the vehicle is in a stable antiskid control operation in which the wheel of said vehicle is experiencing a slipping rate to generate a maximum friction between a road and the wheel or slightly less than said slipping rate; or the vehicle is in an unstable antiskid control operation in which the wheel of said vehicle is experiencing a slipping rate to generate said maximum friction between the road and the wheel or slightly above said slipping rate; wherein said method determines that said moving vehicle is in the stable antiskid control when the wheel acceleration being generated while the wheel speed is decreasing is not less than a pre-determined threshold value, whereas said method determines that said vehicle is in the unstable antiskid control when the wheel acceleration is not more than said threshold value. According to this evaluation method, the fluid pressure in the wheel cylinder is subjected to a first pressure reduction followed by a first pressure increase so as to increase the axial control torque linearly with time, while the wheel speed is decreasing, the wheel acceleration reaches a specific slipping rate for generating the maximum road friction. The threshold value is selected to be close to this slipping rate or a modified slipping rate slightly lower than the specific slipping rate. The control stability is judged to be stable when the wheel acceleration is higher than the threshold value and judged to be unstable when the wheel acceleration is below the threshold value.

A method of antiskid evaluation comprises the steps of: memorizing a wheel speed generated at time t1 when the wheel acceleration attains a pre-determined specific value while the wheel speed of said moving vehicle is increasing; measuring the time interval between said time t1 and time t2 when the wheel speed, after going through a cycle of an increase phase and a decrease phase, again attains said pre-determined specific value; calculating a maximum value of the difference in the wheel speeds during said time interval t1 to t2; dividing said difference with a product of said pre-determined specific value and said time t1 to obtain a determinant D; comparing the determinant D with a threshold value; and deciding that the moving vehicle is in a stable antiskid control operation when said determinant D is not more than said threshold value, and deciding that the moving vehicle is in an unstable antiskid control operation when said determinant D is not less than said threshold value. According to this evaluation method of the antiskid operation, during the linear increase in the axial control torque and while the wheel speed is increasing, the control system memorizes the value of the wheel speed when the wheel acceleration reaches a specific value. The maximum road friction is obtained when the acceleration reaches a value equal to the ration of the maximum difference in wheel speeds and the corresponding time. The threshold value is selected to be close to this slipping rate or a modified slipping rate slightly lower than the specific slipping rate. The control stability is judged to be stable when the wheel acceleration is lower than the threshold value and judged to be unstable when the wheel acceleration is higher the threshold value.

Another method of antiskid control comprises the steps of: memorizing a wheel speed generated at time t1 when the wheel acceleration attains a pre-determined specific value while the wheel speed of said moving vehicle is increasing; measuring the time interval between said time t1 and time t2 when the wheel acceleration becomes zero; calculating the difference in the wheel speeds at said time t1 and at time t2; dividing said difference with a product of said pre-determined specific value and said time t1 to obtain a determinant D; comparing the determinant D with said threshold value; and deciding that the moving vehicle is in a stable antiskid control operation when said determinant D is not more than said threshold value, and deciding that the moving vehicle is in an unstable antiskid control operation when said determinant D is not less than said threshold value. According to this method of evaluation, during the linear increase in the axial control torque and while the wheel speed is increasing, the control system memorize the wheel speed when the wheel acceleration reaches a specific value. The system further memorized the value of the wheel speed when the wheel acceleration becomes zero. The maximum road friction is attained when the wheel acceleration reaches a value calculated on the basis of the maximum difference in the wheel speeds and the corresponding time. A threshold value is selected to be this slipping rate or a modified slipping rate slightly lower than the specific slipping rate. The control stability is judged to be stable when the wheel acceleration is lower than the threshold value and judged to be unstable when the wheel acceleration is higher than the threshold value.

Each of the above method for antiskid control enables the evaluation of the stability of the moving vehicle under antiskid control to be made on the basis of quantitative parameters.

The apparatus for providing the antiskid control operation of the present invention comprises: (a) a wheel speed detection device for determining the wheel speed of a moving vehicle; (b) a pressure modulator for providing at least a first pressure reduction followed by a first pressure increase in a wheel cylinder; (c) a controller for controlling the action of said pressure modulator; wherein during the period of the operation of an antiskid control, said controller activates said controller to perform a first reduction in the fluid pressure to said wheel cylinder followed by a first increase in the fluid pressure, so as to generate a linear increase with time in the axial control torque inclusive of the brake torque, wherein during performing of said first increase in the fluid pressure, said controller decides that: the vehicle is in a stable antiskid control operation, and maintains said first increase in fluid pressure when the acceleration of a wheel is not less than a threshold value while the wheel speed is decreasing based on output signals from said wheel speed detection device, and said controller decides that: said vehicle is in an unstable antiskid control operation, and performs a second pressure reduction when the acceleration of said wheel is not more than said threshold value. According to this antiskid control apparatus, the mode of application of the second increase in pressure is determined on the basis of a threshold value determined as follows. First, while the wheel speed is in the decreasing phase of the linear increase in the axial control torque, the wheel acceleration is calculated from the information obtained from the wheel speed sensor, and determines a specific value when the slipping rate is at the maximum road friction. The threshold value is selected to be close to this slipping rate or a modified slipping rate slightly lower than the specific slipping rate. The control stability is judged to be stable when the wheel acceleration is higher than the threshold value, and the controller commands the pressure modulator to maintain the application of the fluid pressure on the wheel; and the control stability is judged to be unstable when the wheel acceleration is lower the threshold value, and the controller commands the pressure modulator to perform a second reduction in the fluid pressure to the wheel.

Another apparatus for providing the antiskid control operation of the present invention comprises; (a) a wheel speed detection device for determining the wheel speed of a moving vehicle; (b) a pressure modulator for providing at least a first pressure reduction followed by a first pressure increase in a wheel cylinder; (c) a controller for controlling the action of said pressure modulator; wherein during the period of the operation of an antiskid control, said controller performs a first reduction in the fluid pressure to said wheel cylinder followed by a first increase in the fluid pressure, so as to generate a linear increase with time in the axial control torque inclusive of the brake torque, wherein during performing of said first increase in the fluid pressure, said controller provides antiskid control actions comprising the steps of: determining the variations in the wheel speed with time based on the signals from said wheel speed detection device; memorizing a wheel speed at time t1 when the wheel acceleration attains a specific value while said vehicle is undergoing a speed increase; measuring the time interval between t1 and t2 when the wheel speed again reaches said memorized value of wheel speed after a temporary decrease; calculating a maximum value of the difference in the wheel speeds at times t1 and t2; and calculating when the value of a determinant D obtained by dividing the maximum value by a product between said specific value of the wheel acceleration and said time interval given by t2–t1; and deciding that the vehicle is in a stable antiskid control operation when said determinant D is not more than a threshold value and maintaining said first increase in the fluid pressure; and deciding that the vehicle is in an unstable antiskid control operation when said determinant D is not less than said threshold value and providing a second reduction in the fluid pressure. According to this apparatus, the mode of application of the second increase in pressure is determined on the basis of a threshold value determined as follows. First, while the wheel speed is in the decreasing phase of the linear increase in the axial control torque, the wheel acceleration is calculated from the information obtained from the wheel speed sensor, and determines a specific value when the slipping rate is at the maximum road friction. The threshold value is selected to be close to this slipping rate or a modified slipping rate slightly lower than the specific slipping rate. The control stability is judged to be stable when the wheel acceleration is higher than the threshold value, and the controller commands the pressure modulator to maintain the application of the fluid pressure on the wheel; and the control stability is judged to be unstable when the wheel acceleration is lower the threshold value, and the controller commands the pressure modulator to perform a second reduction in the fluid pressure to the wheel.

Another apparatus of the present invention comprises:

(a) a wheel speed detection device for determining the wheel speed of a moving vehicle; (b) a pressure modulator for providing at least a first pressure reduction followed by a first pressure increase in a wheel cylinder; (c) a controller for controlling the action of said pressure modulator; wherein during the period of the operation of an antiskid control, said controller activates said controller to perform a first reduction in the fluid pressure to said wheel cylinder followed by a first increase in the fluid pressure, so as to generate a linear increase with time in the axial control torque inclusive of the brake torque, wherein during performing of said first increase in the fluid pressure, said controller provides antiskid control actions comprising the steps of: determining the variations in the wheel speed with time based on the signals from said wheel speed detection device; memorizing a wheel speed at time t1 when the wheel acceleration attains a specific value while said vehicle is undergoing a speed increase; measuring the time interval between t1 and t2 when the wheel acceleration attains a value zero; calculating a maximum value of the difference in the wheel speeds at times t1 and t2; and calculating the value of a determinant D obtained by dividing the maximum value by a product between said specific value of the wheel acceleration and said time interval given by t2–t1; and deciding that the vehicle is in a stable antiskid control operation when said determinant D is not more than a threshold value and maintaining said first increase in the fluid pressure; and deciding that the vehicle is in an unstable antiskid control operation when said determinant D is not less than a threshold value and providing a second reduction in the fluid pressure. According to this apparatus, the maximum difference in the wheel speeds during the speed increasing phase of the antiskid control is determined: the wheel speed at time t and the wheel speed when the acceleration is zero from the wheel speeds memorized in the memory. The slipping rate at which the maximum road friction is generated is calculated on the basis of the maximum difference and the acceleration and time. A threshold value is selected to be near this slipping rate or a slightly modified value. The control operation is judged to be stable when the wheel acceleration is lower than the threshold value, the control is determined to be stable, and the controller commands the pressure modulator to maintain the application of the fluid pressure on the wheel. The control operation is judged to be unstable when the wheel acceleration is higher than the threshold value, and the controller commands the pressure module to reduce the fluid pressure on the wheel.

According the apparatuses presented above, the stability of the antiskid operation is evaluated on the basis of quantitative parameters, and the fluid pressure is regulated to be increased or decreased accordingly. The parameters are determined so as to produce a slipping rate which generates a maximum road friction, as well as to produce the minimum range of slipping action.

Another method for antiskid control operation is to perform a first pressure reduction in a wheel cylinder operatively connected to said wheel; followed by a second pressure increase, thereby increasing the axial control torque linearly with time, inclusive of the brake torque, and following said second pressure increase, a second pressure reduction is provided on the basis of changes in the wheel slipping rate with respect to the coefficient of friction between said wheel and a road; wherein when wheel speed pulsations are not present, said changes are calculated or estimated on the basis of a plurality of wheel speeds measured at regular time intervals, and when wheel speed pulsations are present, said changes are calculated or estimated on the basis of a plurality of successive maxima and minima in the wheel speeds. This method is related to obtaining the change rate k for the case of the wheel speed pulsations and for the case of no wheel speed pulsations. When the wheel speed is not pulsating, successive values of the wheel speeds are used to calculate or estimate the change rate, and when the change rate is lower than the threshold value, the control is judged to be unstable and the fluid pressure is decreased. When the wheel speed is pulsating, the change rate is calculated on the basis of the average values of the successive maxima and minima in the wheel speeds. However, the average values of the maxima and the minima of the wheel speeds vary in the same way with time as the wheel speeds when there are no pulsations. Therefore, the maxima and minima of the wheel speeds can be used to calculate the change rate with the same accuracy as when there are no pulsations.

Another apparatus for providing an antiskid control operation of a wheel in a moving vehicle comprises: (a) a wheel speed detection device for determining the wheel speed of a moving vehicle; (b) a pressure modulator for providing at least a first pressure reduction followed by a first pressure increase in a wheel cylinder; (c) a controller for controlling the action of said pressure modulator; wherein during the period of the operation of an antiskid control, said controller performs a first reduction in the fluid pressure to said wheel cylinder followed by a first increase in the fluid pressure, so as to generate a linear increase with time in the axial control torque inclusive of the brake torque, and a second pressure reduction is provided on the basis of changes in the wheel slipping rate with respect to the coefficient of friction between said wheel and a road; wherein when wheel speed pulsations are not present, said changes are calculated or estimated on the basis of a plurality of wheel speeds measured at regular time intervals, and a second pressure reduction is provided when a change in the wheel slipping rate with respect to the coefficient of friction between said wheel and a road is not more than a threshold value; and wherein when wheel speed pulsations are present, said changes are calculated or estimated on the basis of a plurality successive maxima and minima in the wheel speeds, and a second pressure reduction is provided when changes in the wheel slipping rate with respect to the coefficient of friction between said wheel and the road is not less than said threshold value. This apparatus is able to calculate the change rate k when the wheel is experiencing speed pulsations and no speed pulsations. When the wheel speed is pulsating, successive values of the wheel speeds are used to calculate or estimate the change rate, and when the change rate is lower than the threshold value, the control operation is judged to be unstable, and the controller commands the pressure control module to undertake the second pressure reduction. When the wheel speed is pulsating, the change rate is calculated on the basis of successive maxima and minima in the wheel speeds. However, the average values of the maxima and the minima of the wheel speeds vary with time in the same way as the wheel speeds when there are no pulsations. Therefore, the maxima and minima of the wheel speeds can be used to calculate the change rate at the same accuracy as when there are no pulsations.

According to the above method and the apparatus for providing antiskid control operation are based on the observations made in the present invention that when there are pulsations in the wheel speed, the average values of maxima and minima of the wheel speeds show the same variation with time as the wheel speeds when there are no pulsations. Therefore, even when there are pulsations, the method and the apparatus based on the method are able to provide the change rate without the loss of accuracy.

Therefore, even if the wheel speeds are varying due to reasons external to the axial system, the change rate can be calculated or estimated so that antiskid control operation can be provided in the same as when there are no pulsations, tbereby avoiding wheel lock up, and enabling to utilize the maximum road friction.

BRIEF EXPLANATION OF THE DRAWINGS

FIG. 4(A) shows the relationship between wheel speed and time according to the first embodiment in which k>0.

FIG. 4(B) shows the relationship between wheel acceleration and time according to the first embodiment in which k>0.

FIG. 4(C) shows the relationship between axial torque and time according to the first embodiment in which k>0.

FIG. 11(A) shows the relationship between wheel speed and time according to the second and the third embodiments in which k>0.

FIG. 11(B) shows the relationship between wheel acceleration and time according to the second and the third embodiments in which k>0.

FIG. 11(C) shows the relationship between axial torque and time according to the second and the third embodiments in which k>0.

FIG. 12(A) shows the relationship between wheel speed and time according to the second and third embodiments in which k<0.

FIG. 12(B) shows the relationship between wheel acceleration and time according to the second and the third embodiments in which k<0.

FIG. 12(C) shows the relationship between axial torque and time according to the second and the third embodiments in which k<0.

PREFERRED EMBODIMENTS

A first embodiment of the control condition evaluation method and an antiskid control device based on the method of the present invention will be presented below with reference to FIGS. 1 to 9.

Initially, the principle of the operation of the first embodiment of the control evaluation method will be explained.

The equation of motion of the wheel axis 2 supporting the wheel 1 is expressed by the following equation (1).

$$R\omega' = WR^2/I \cdot \{\mu - Q/(WR)\} \tag{1}$$

In equation (1), a load W is applied to the wheel 1 of an effective radius R rotating at an angular speed ω. The parameter ω' is the derivative with respect to time of the angular wheel speed ω. The wheel 1 is under an axial torque Q which turns the axis 2 with a rotation moment I. The coefficient of friction between the wheel 1 and the road is μ.

Figure 2:
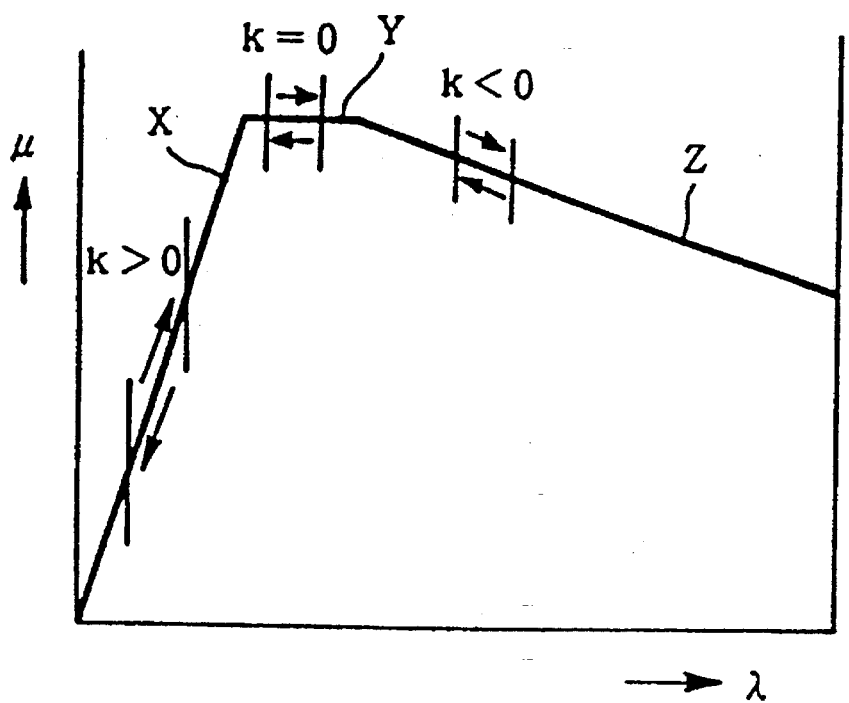
FIG. 2 is a graph showing the relationship between the slipping rate $\lambda$ and the coefficient of friction $\mu$ between the road and the wheel.

In the meanwhile, the relationship between the coefficient of friction μ and the slipping rate λ of the wheel is in general as shown in FIG. 2. The parameter k is the value of the slope, k=dμ/dλ, and is k>0 in the X region, K=0 in the Y region and k<o in the Z region. The maximum friction between the road and the wheel 1 occurs in the region Y in which k=0. Centering around the Y region, a stable antiskid control operation is possible without wheel lock up to the left of the Y region where the values of λ are small, and an unstable operation with wheel lock up occurs to the right of the Y region where the values of λ are large.

Figure 3A:
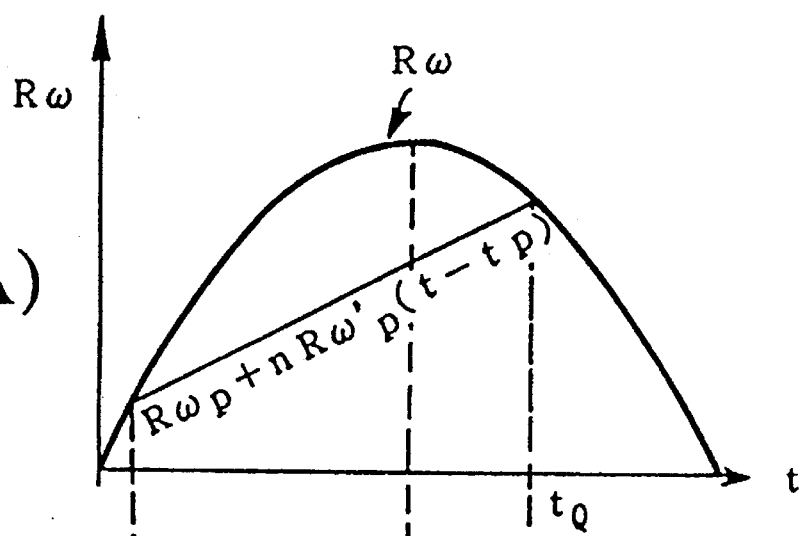
FIG. 3(A) shows the relationship between wheel speed and time according to the first embodiment in which k=0.
Figure 3B:
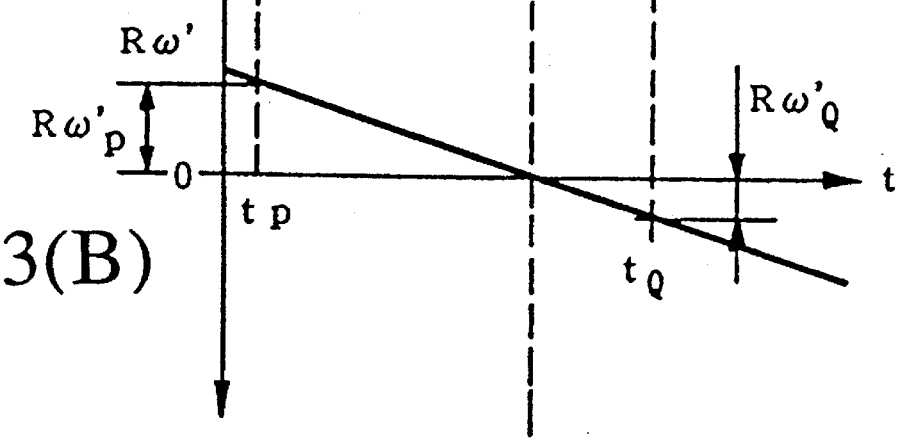
FIG. 3(B) shows the relationship between wheel acceleration and time according to the first embodiment in which k=0.

When the vehicle is in an antiskid control operation under the condition of k=0, the wheel speed undergoes dynamic phases as illustrated in FIG. 3(A), which can be derived by considering the changes in the acceleration of the wheel which will be discussed below. Specifically, when the brake pressure is lowered so as to avoid wheel lock up, the wheel accelerates instantly as shown in FIGS. 3(B) during the period 1 in which the brake pressure in the wheel cylinder is being reduced. From equation (1), the accelerating period of the wheel is expressed by $R\omega'>0$ that is $\mu>Q/(RW)$. The wheel then goes through the period 2, in this case, the axial control torque on the wheel axis 2 is being increased in a linear manner as shown in FIG. 3(B). In this period $R\omega'=0$ that is $\mu=Q/(WR)$. The vehicle then enters into a decelerating period 2, in which $R\omega'<0$ that is $\mu<Q/(RW)$. Because the coefficient of the road friction $\mu$ is constant, and the value of $Q/(RW)$ is being increased linearly, $\mu-Q/(WR)$ decreases linearly, thus leading to a linear decrease in $R\omega'$ throughout the stages 1 and 2.

In accordance with the above discussion, the differential equation can be integrated over the time limits between $t=0$ to $t=t$ during the operational period of the antiskid control operation, the speed $R\omega$ of the wheel 1 can be represented by the curve in FIG. 3(A). The shape of this second degree curve is symmetric with respect to the point $R\omega'=0$.

Since $\mu$ is constant and $Q/(RW)$ is increasing linearly with time, by letting $R\omega'$ at time $t_0$ be $R\omega'_0$ then, $$R\omega'=R\omega'_0-A(t-t_0) \quad (2)$$

where A is a parametric constant, and t is time.

Also, by letting $R\omega$ at time $t_0$ be $R\omega_\theta$ the above equation (2) can be integrated over the limits from time $t$ to time $t_0$ to obtained the following expression for $R\omega$ $$R\omega=R\omega_0+R\omega'_0(t-t_0)-\tfrac{1}{2}\cdot A(t-t_0) \quad (3)$$

When $k>0$, that is when the vehicle is in a stable antiskid control operation, the value of $\mu$ changes such that it decreases somewhat rapidly in period 1 in which $R\omega'>0$, reaching the lowest value near $R\omega'=0$ as shown in FIG. 4(C), and rising slowly in period 2 in which $R\omega'<0$. Therefore, $Q/(RW)$ increases linearly with time. The rate of change of the term $(\mu-Q/RW)$ in equation (1), in period 1 where $R\omega'>0$, is larger than that of the corresponding one in period 2 where $R\omega'<0$, and the response of $R\omega'$ changes as shown in FIG. 4(B). In other words, the curve of $R\omega'$ changes such that the slope of the curve changes from a large negative value to a smaller value as it approaches zero, and continues to decrease with passing of time. The result is that the value of $R\omega$ changes such that, as shown in FIG. 4 (A), it rises quickly in period 1 where $R\omega'>0$, and slowly decreases in period 2 where $R\omega'<0$.

When $k<0$, i.e., the vehicle is in an unstable antiskid control operation, the value of $\mu$ changes such that it rises slowly in period 1 where $R\omega'>0$, peaking near $R\omega'=0$, and decreases rapidly in period 2 where $R\omega'<0$. It follows that because $Q/(WR)$ increases linearly with time, the rate of increase of the term $(\mu-Q/WR)$ in equation (1) in period 1 where $R\omega'>0$ becomes smaller than that in period 2 where $R\omega'<0$, and the response of $R\omega'$ changes as shown in FIG. 5(B). In other words, the slope of the $R\omega'$ curve becomes larger towards the negative side from the region of zero, and as the time passes, the rate of change increases. The result is that $R\omega$ rises slowly in period 1 where $R\omega'>0$, and decreases relatively quickly in period 2 where $R\omega'<0$.

Figure 3C:
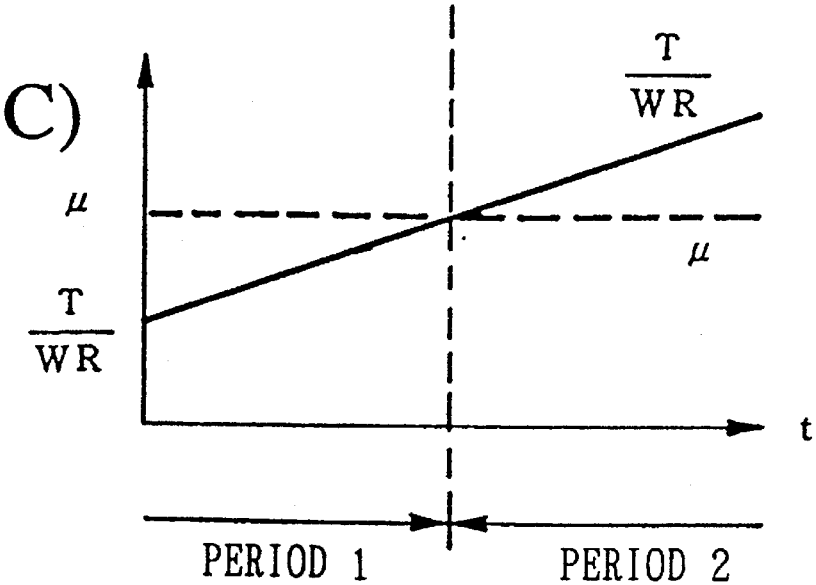
FIG. 3(C) shows the relationship between axial torque and time according to the first embodiment in which k=0.

When $k=0$, by the application of a second increase in the pressure of the wheel cylinder subsequent to the first reduction in the pressure in the wheel cylinder following the first increase in the pressure, the axial torque inclusive of the braking torque is increased linearly with time as shown in FIG. 3(C). At this time, the assisting speed which is shown by a straight line in FIG. 3(A) and defined by $R\omega_P+nR\omega'_P(t-t_P)$ is calculated by letting $R\omega'_P$ be the wheel acceleration at time $t_P$. Here, n is a parametric constant such that $0<n<1$ (in practice $0<n<0.5$), and $nR\omega'_P$ is also a parametric constant.

The above equations (2) and (3) are valid for the cases of $(\omega_0-\omega_P, \omega'_0=\omega'_P, t_0=t_P)$. It follows that in period 2 where the wheel speed is decreasing, the following equations are valid at time $t_Q$ when the assisting speed becomes equal to the value of $R\omega$.

$$R\omega_P+nR\omega'_P(t_Q-t_P) = R\omega_P+R\omega'_P(t_Q-t_P)-\tfrac{1}{2}A\cdot(t_Q-t_P)^2$$

Therefore, $A=2R\omega'_P(1-n)/(t_Q-t_P)$, and further, from equation (2), the acceleration $R\omega'_Q$ at time $t_Q$ is given by:

$$\begin{aligned} R\omega'_Q &= R\omega'_P - A(t_Q-t_P) \quad (4)\\ &= R\omega'_P - 2R\omega'_P(1-n)\\ &= -(1-2n)R\omega'_P \end{aligned}$$

Here, as shown in FIG. 4(A), when $k>0$, the response of the wheel speed $R\omega$ is asymmetrical with respect to the center point at $R\omega'=0$, and the change in wheel speed is less in the deceleration side. The deceleration $-R\omega'_Q$ is less than that in the case of $k=0$. Therefore, the wheel acceleration is expressed as:

$$R\omega'_Q > -(1-2n)R\omega'_P$$

Figure 5A:
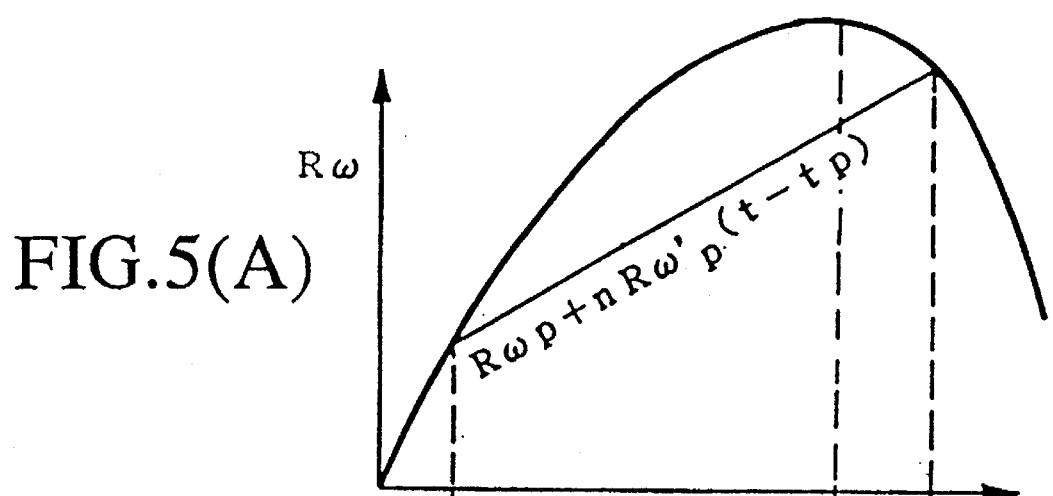
FIG. 5(A) shows the relationship between wheel speed and time according to the first embodiment in which k<0.
Figure 5B:
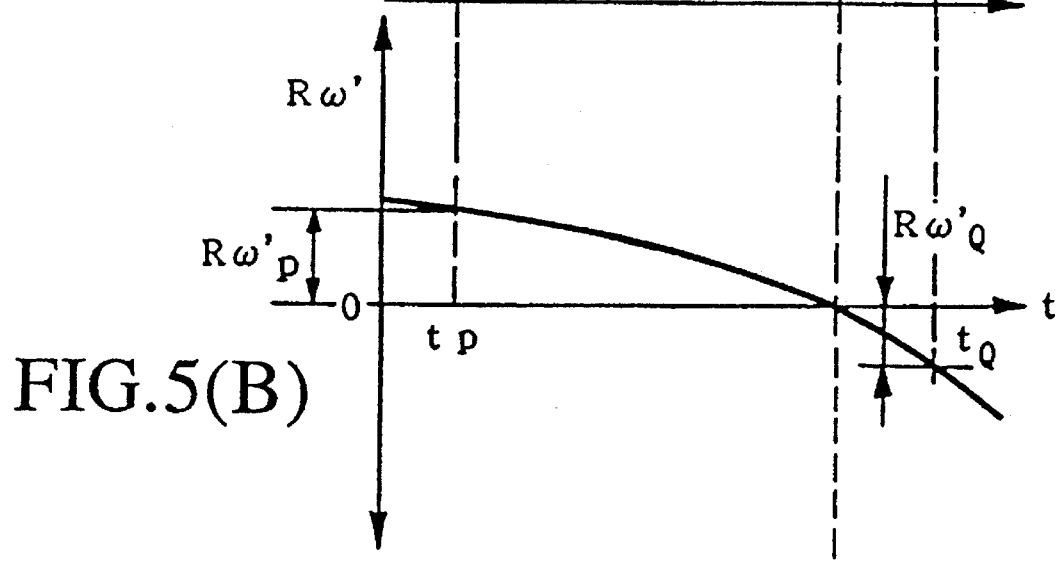
FIG. 5(B) shows the relationship between wheel acceleration and time according to the first embodiment in which k<0.
Figure 5C:
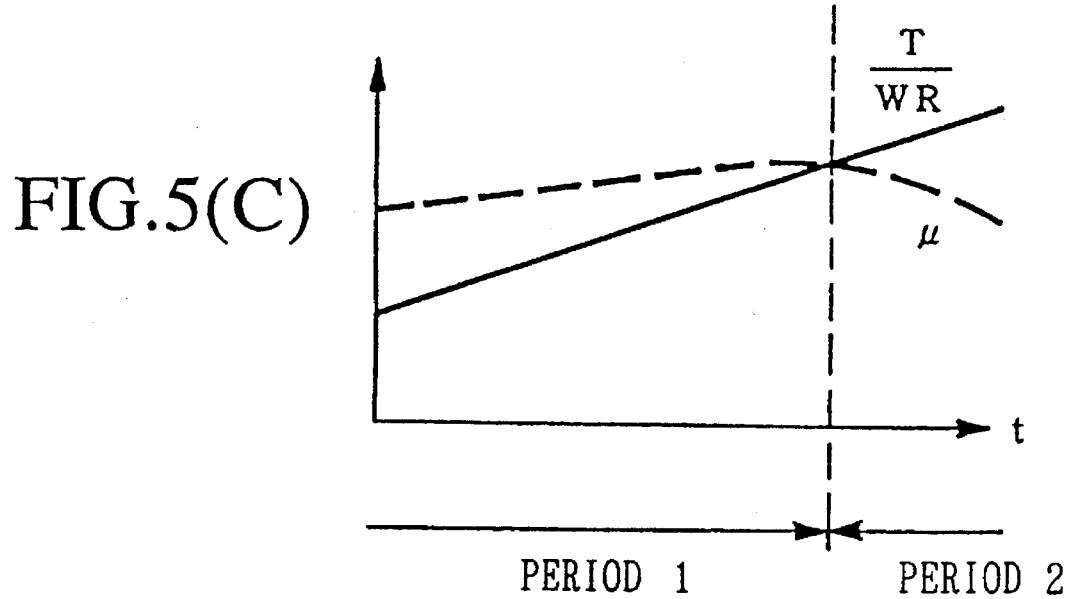
FIG. 5(C) shows the relationship between axial torque and time according to the first embodiment in which k<0.

On the other hand as shown in FIG. 5(A), when $k<0$, the change in the wheel speed on the deceleration side is large, therefore, $-R\omega'_Q$ becomes larger than that for the case of $k=0$, and the following is valid for the wheel acceleration.

$$R\omega'_Q < -(1-2n)R\omega'_P$$

It follows therefore that the polarity of k to judge whether the vehicle is in a stable control operation or unstable control operation can be made in terms of the above inequality relationships which compare the values of $R\omega'_Q$ and $-(1-2n)R\omega'$.

Also, the right terms in the above equation $(4)-(1-2n)R\omega'_P$ is independent of the rotational moment, wheel speed and the time-dependent increase of axial torque, therefore, the value of $-(1-2n)R\omega'_P$ can be determined by specifying the values of $R\omega'_P$ and n.

For example, if $R\omega'=2$ G is assumed where G is the gravitational acceleration, n can be set as 0.3, 0.35, 0.4, 0.45 and 0.5, then when $k=0$ the values of $-(1-2n)R\omega'_P$ become 0.8 G, 0.6 G, 0.4 G, 0.2 G and 0 G, respectively.

Figure 6:
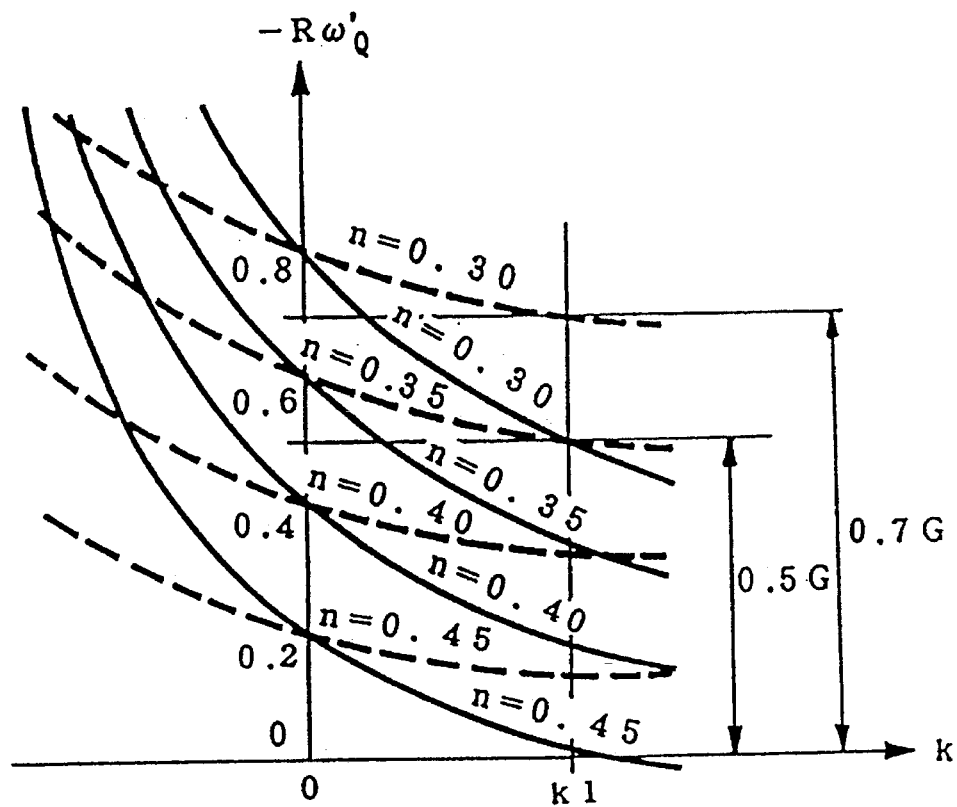
FIG. 6 shows the method of evaluation according to the first embodiment on the basis of the values of the change rate k and deceleration of the wheel.

Here, from the relationships of $-R\omega'_Q$ for the case of $k>0$ and $k<0$, the relationship between k and the wheel deceleration, $-R\omega'_Q$ becomes a solid curve decreasing to the right as shown in FIG. 6. The solid lines in FIG. 6 correspond to the case of $n=0.35$, 0.4, and 0.45, respectively.

As explained above, according to the first embodiment, the condition of the antiskid control operation can be judged quantitatively to provide reliable measure of stable or unstable control of the vehicle.

Next, a first embodiment of the application of the above method of evaluation to an antiskid control device will be explained in the following.

Figure 7:
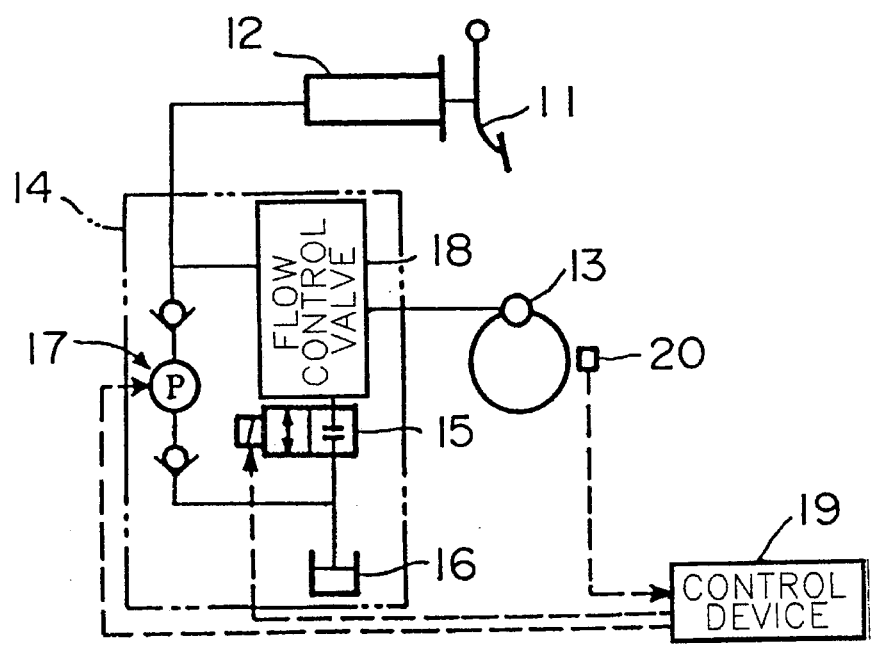
FIG. 7 is a schematic representation of the antiskid control device of the first embodiment.

FIG. 7 is a schematic illustration of the pressure system of an antiskid braking device for use with motor vehicles. The pressure system comprises a pedal 11 which generates a fluid pressure in a master cylinder 12, and the pressure is transmitted to a wheel cylinder 13 which controls the wheel 1 via a pressure modulator 14. The wheel cylinder 13 is for the control operation of the wheel 1 through such means as a disk brake or a drum brake.

The pressure modulator 14 comprises a normally-closed electro-magnetic (n/c em) valve 15; a variable volume reservoir 16; a pump 17 which withdraws the brake fluid from the reservoir 16; and a flow control valve 18. The flow control valve 18 communicates the master cylinder 12 with the wheel cylinder 13 during the normal operation of the braking system without the antiskid control during which the n/c em valve 15 is closed. During the pressure reducing phase of the antiskid operation, the n/c em valve 15 is activated, and the flow control valve 18 shuts off the communication between the master cylinder 12 and the wheel cylinder 13 while communicating the wheel cylinder 13 and the reservoir 16 so as to let the brake fluid in the wheel cylinder 13 flow into the reservoir 16. During the first increase in the pressure of the antiskid control operation while the n/c em valve 15 is closed, the flow control valve 18 allows the brake fluid discharged by the pump 17 from the reservoir 16 to flow into the wheel cylinder 13 at a constant volume rate so as to maintain the increase rate in the control brake torque at a constant value. Here, the brake fluid which was made to flow into the reservoir 16 during the pressure reducing phase of the antiskid control operation, is returned to the master cylinder 12 by the pump 17.

The n/c em valve 15 and the pump 17 are connected to a control device 19 which is provided with a wheel speed sensor 20 which determines the rotational speed of the wheel 1, and generates a pulse signal for each rotation of the wheel 1.

Figure 8:
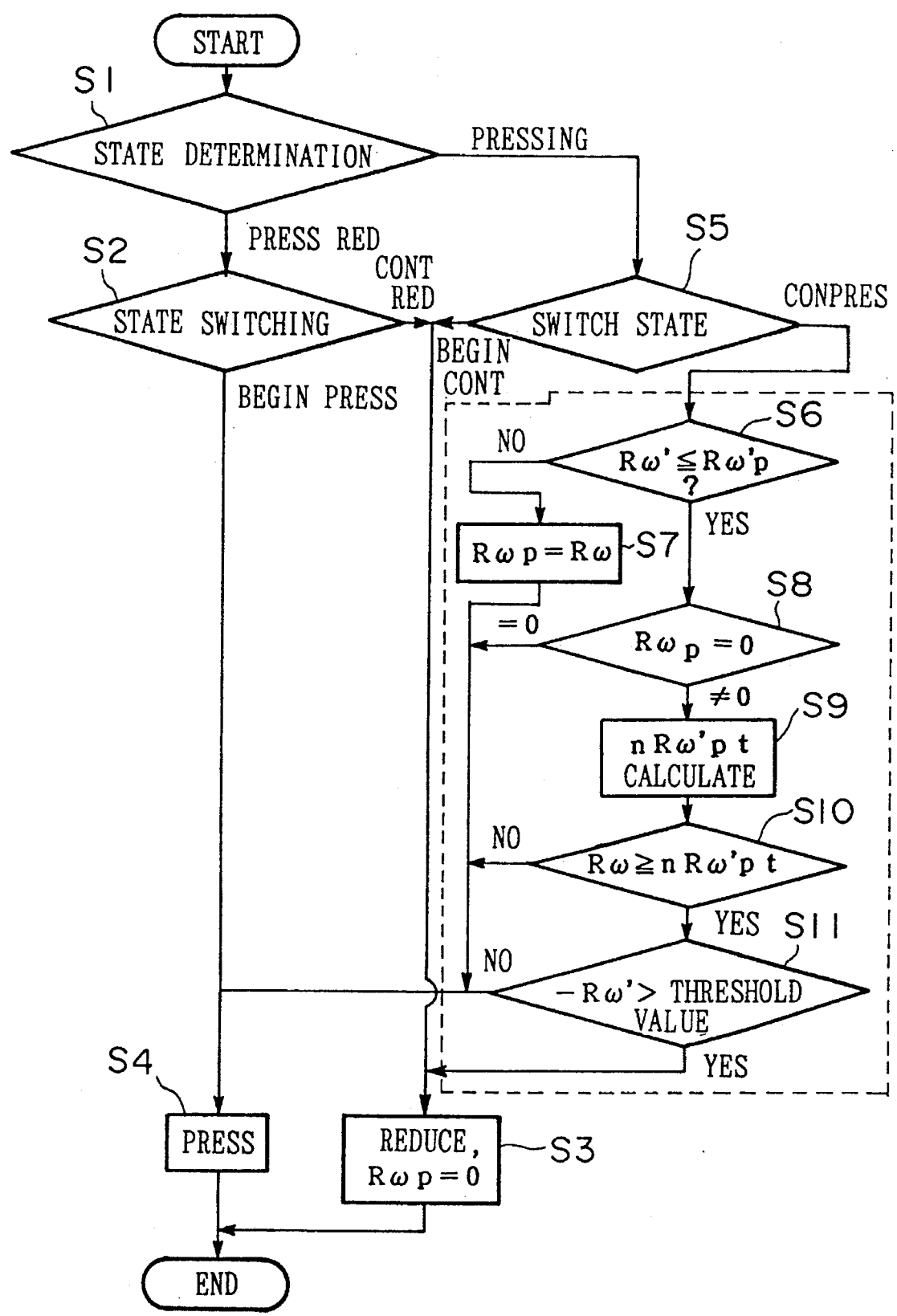
FIG. 8 is a flow chart showing the control steps for the antiskid control device of the first embodiment.

The operation of the control device 19 will be explained step by step with reference to a flow chart shown in FIG. 8.

At the time of the start of the antiskid control operation (i.e., the beginning of the first pressure reducing phase), the control device 19 computes the slipping rate or the amount of slip occurring in the wheel 1 (calculated with reference to the pseudo vehicle speed v deduced on the basis of the wheel speed determined from the wheel speed sensor 20), and decides that the wheel is tending to lock up when the slipping rate or the amount of slip exceeds a pre-determined threshold value. Other method includes a comparison of the current condition with a previously established threshold value of the slipping rate or the amount of slip occurring in the wheel 1, and decides that the wheel is tending to lock up when the threshold value is exceeded and enters into the antiskid control operation. Other method includes a comparison of the current condition with the deceleration of the wheel 1 with a previously established threshold value, and enters into the control operation when the threshold value is exceeded. There are many variations of the basic methodology, and these may be combined suitably.

Step S1

First, assuming that the vehicle is in the antiskid control operation initiated by the first increase in the pressure, the control device 19 (henceforth referred to as it), decides whether the brake pressure in the wheel cylinder 13 is in the pressure reducing phase or the second pressuring phase from the data in the memory. If it decides that the system is in the first pressure reducing phase, it proceeds to step S2, and if it decides that the system is in the second increase in the pressure, it proceeds to step S5.

Step S2

It decides whether to continue the first pressure reducing phase or stop the first pressure reduction and begin second increase in the pressure from the magnitude of the computation results of the wheel acceleration $R\omega'$ by calculation on the basis of the pulse signals from the rotational speed sensor 20, for example. If it determines that the wheel acceleration $R\omega'<\alpha$ (where $\alpha$ is a specified threshold value), then it decides that the wheel 1 is sill tending to lock up, and it proceeds to step S3 to continue the first pressure reduction. If $R\omega'>\alpha$ it decides that the locking tendency has been averted, and it proceeds to step S4 to the second increase in the pressure of the system.

Step S3.

It outputs an activation signal to the n/c em valve 15, and to the pump 17. Accordingly, the n/c em valve 15 becomes open (or maintains the valve 15 open), and the flow control valve 18 shuts off the communication between the master cylinder 12 and the wheel cylinder 13, and communicates the wheel cylinder 13 and the reservoir 16, thus returning the brake fluid in the wheel cylinder 13 to the reservoir 16 so as to reduce the fluid pressure.

Step S4

It stops outputting the activation signal to the n/c em valve 15, and outputs an activation signal to the pump 17. By so doing, the operative pump 17 withdraws/discharges the brake fluid in side the reservoir 16, and the brake fluid flows into the wheel cylinder 13 through the flow control valve 18 at a constant rate, and the wheel cylinder 13 is pressurized at a constant rate.

Step S5

In step S1, if it decides that the system is in the second increase in the pressure of the antiskid operation, it decides in step S5 whether to continue the second pressurization or to switch to the pressure-reducing phase. The evaluation reference is basically the same as that at the start of the antiskid operation which has been described already. Here, if it decides that the wheel 1 is tending to lock up, and that the fluid pressure needs to be reduced, it proceeds to step S3. If it decides that the wheel 1 is not tending to lock up, and that pressurization should be continued, it proceeds to step S6.

It should be noted that the following steps S6 to S11 correspond to the application of the first embodiment of the device for evaluating the operating condition of the antiskid operation.

Step S6

It determines whether the wheel acceleration $R\omega'$ is below the threshold value $R\omega'_P$ which had been selected. If the current value is below the threshold value, it proceeds to step S8, otherwise, it proceeds to step S7.

Step S7

The current value of $R\omega$ is taken as $R\omega_P$ and it proceeds to step S4.

Step S8

It determines whether the value of $R\omega_P$ is 0, and if it is 0, it proceeds to step S4, otherwise it proceeds to step S9.

Step S9

In the above steps S6 to S8, it memorizes the value of $R\omega$ at the time $t_P$ as $R\omega_P$, i.e., when the condition $R\omega'>R\omega'_P$ changes to the condition $R\omega'<R\omega'_P$. Subsequent to time $t_P$, the steps S9 to S11 are executed.

Step S9

It computes the assisting speed $rR\omega'_P(t)$ so as to produce a linear time dependence.

Step S10

It determines whether the value of $R\omega$ is larger or smaller than $nR\omega'_P(t)$. If the value is larger, it proceeds to step S11, and if the value is smaller, it proceeds to Step S4. Step 11 is repeated through the stages until $R\omega=R\omega'_P(t)$.

Step S11

It determines whether or not the current value of the $-R\omega'$ is larger than the threshold value. It the current value is larger, it proceeds to step S3 to carry out pressure reduction, and if the current value is smaller than the threshold value, it proceeds to step S4 to carry out the second pressurization.

The above steps S6 to S11 are for the purpose of determining whether the condition, $-R\omega'>$threshold value, has been attained in the time period $t_P$ to $t_Q$. If the current value of $-R\omega'$ does not become larger than the threshold value, then it decides that the antiskid control is stable, and it maintains the second pressurization. When the condition of $-R\omega'>$threshold value is reached, it decides that the control is unstable, and it carries out the pressure-reducing operation immediately.

In the first embodiment presented above, the control system is arranged so that when k is negative, the controller decides immediately that the control is unstable (i.e., it presupposes that k=0 is the standard operating condition). Therefore, the threshold value used to check the condition $-R\omega'>$threshold value is the parametric constant $(1-2n)R\omega'_P$.

As described above, according to the first embodiment, the evaluation of the operating condition of the antiskid control system is made quantitatively to determine whether the vehicle is in a stable or an unstable control condition. Therefore, it is possible to reliably determine the control conditions to prevent wheel lock up while controlling the slipping rate to make sure that the maximum friction is being maintained between the road and the vehicle (termed the road friction). Such an arrangement is also effective in narrowing the variation range of the slipping rate during the skid control operation.

Figure 9:
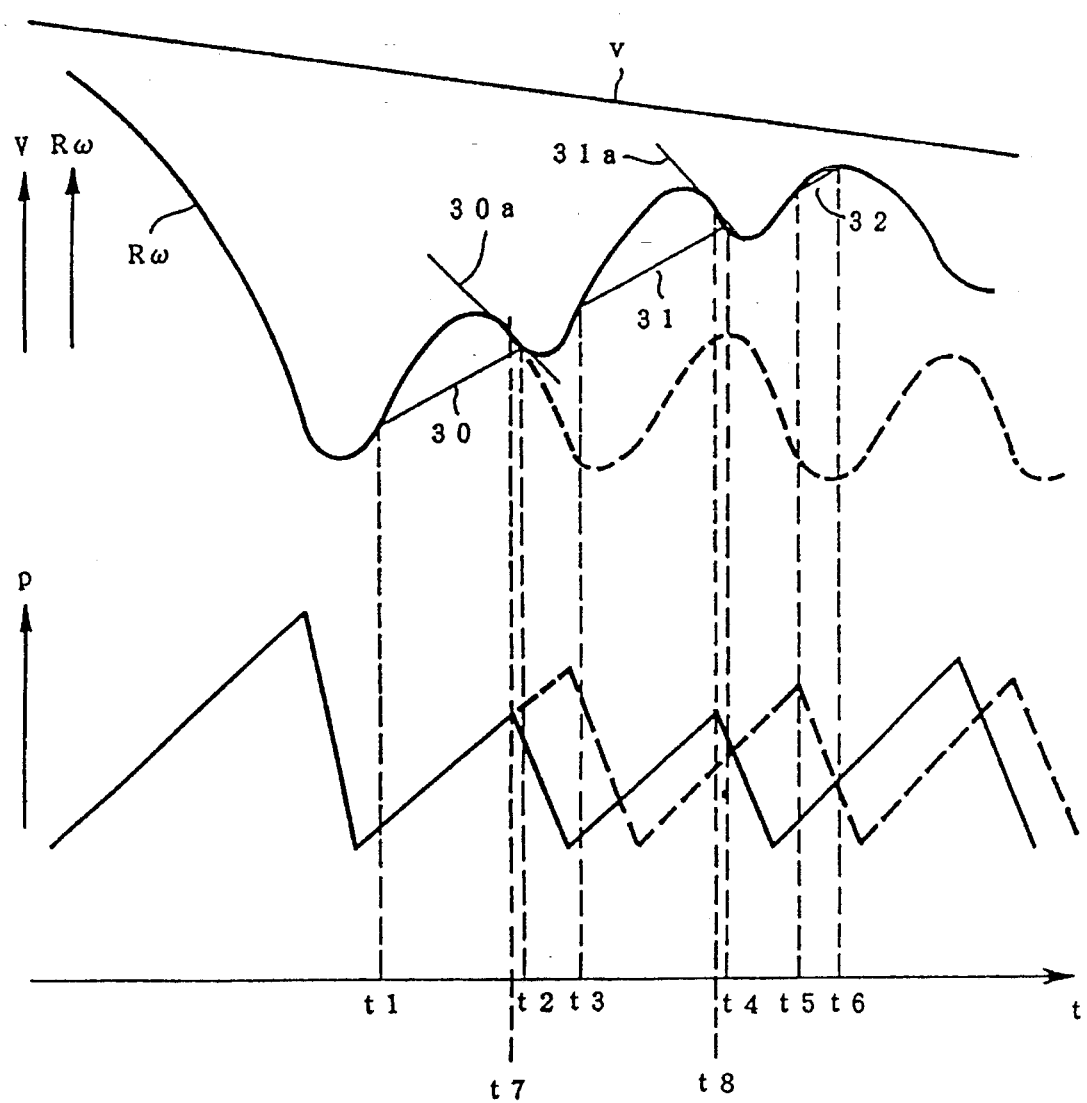
FIG. 9 shows the method of evaluation according to the first embodiment of the antiskid control device.

The solid curve shown in FIG. 9 shows the control curve of the antiskid device of the first embodiment. In this figure, the lines 30, 31 and 32, represent the assisting speed according to the $nR\omega'_P(t)$, and are used to evaluate the operating conditions in the stages between the time intervals $t_1$ to $t_2$, $t_3$ to $t_4$ and $t_5$ to $t_6$. In the time intervals, $t_1$ to $t_2$ and $t_3$ to $t_4$, the value of k, in the $\mu/\lambda$ relationship, is low, thereby leading to the condition of $-R\omega'>$threshold value, shown by the lines 30a and 31a, and the control device immediately carries out the pressure reducing operation (as indicated by P in FIG. 9) at times $t_7$ and $t_8$ and the wheel speed is recovered quickly. This means that the condition leading to a large slipping rate does not last long, enabling to provide an effective control operation. In contrast, the performance of the conventional antiskid device shown by the dotted line in FIG. 9, does not specify the frictional condition of the operation in terms of the $\mu/\lambda$ relationship, and the condition of large slipping rate is maintained for an extended duration, and the real objective of antiskid control operation cannot be achieved.

Further in the first embodiment, it is also possible to evaluate whether the vehicle is in a stable or unstable control operation with the use of a positive k value close to k=0. The following explains how this can be achieved.

When choosing a positive value of $k_1$ close to k=0, n=0.3 shown in FIG. 6 may be chosen. The value of $-R\omega'$ is equal to 0.5 G at $K_1$. This means that at the times $t_Q$ shown in FIGS. 3(A), 3(B), 3(C), 4(A), 4(B), 4(C), 5(A), 5(B) and 5(C), i.e. when the wheel speed is such that $R\omega=R\omega_P+nR\omega'_P(t_Q-t_P)$ is reached, then $-R\omega'=0.5$ G. Furthermore, as shown in FIGS. 3(A), 3(B), 3(C), 4(A), 4(B), 4(C), 5(A), 5(B) and 5(C), during the time period $t_P<t<t_Q,-R\omega'<0.5$ G and it is only at time $t_Q$ that $-R\omega'_Q=R\omega'=0.5$ G is attained.

When $k>k_1$, it can be understood that at the time $t_Q$, the condition that $-R\omega'_Q<0.5$ G is produced, which is maintained during the time period $t_P$ to $t_Q$.

When $k<k_1$, it can be understood that during the time intervals $t_P$ to $t_Q$, the condition that $-R\omega'>0.5$ G is produced to produce the condition that $-R\omega'>0.5$ G at time $t_Q$.

Therefore, by setting the threshold value (in the above example 0.5 G) from the parametric constants, $-R\omega'_P$, n and the target value of k, and by comparing the threshold value with the wheel deceleration $-R\omega'$ in the time period between $t_P$ and $t_Q$; the determination of the condition of the skid control may be made on the following bases:

if $-R\omega'>$threshold value, k is close to 0 or negative;

if $-R\omega'<$threshold value and at time $t_Q$, $-R\omega'=$threshold value, then k is optimum; and if $-R\omega'<$threshold value and this condition is persisting at time $t_Q$ then, k is excessive.

In accordance with the above criteria, when the evaluation of stable/unstable operating condition of the vehicle is being made on the basis of a positive value of k close to 0, the threshold value should be chosen so that it is smaller than the value of threshold, $(1-2n)R\omega'$, when it is based on k=0.

In FIG. 6, the curves sloping to the right will change depending on the wheel speed and on the proportional increase in the axial torque. For example, when the vehicle speed increases, slipping rate changes little and the coefficient of friction $\mu$ also changes very little. Under these conditions, the response curve shown in FIGS. 4(A), 4(B), 4(C), 5(A), 5(B) and 5(C) approach those shown in FIGS. 3(A), 3(B) and 3(C). Also, when the increase in the proportional axial torque is large, the effect of $\mu$ in the term $\mu-Q/(WR)$ in the above equation (1) becomes small, the wheel 1 rotates as though $\mu$ is constant, and the response curve approaches that shown in FIGS. 3(A), 3(B) and 3(C). In other words, within the range of k>0, the fact that the response curves in FIGS. 4(A), 4(B) and 4(C) approach those in FIG. 3(A), 3(B) and means that the wheel deceleration $(-R\omega'_Q)$ is increasing; and within the range of k<0, it means a converse that the deceleration is becoming smaller. That is to say, when the wheel speed or the increase in the proportional axial torque is large, the relationship between k and $-R\omega'_Q$ becomes milder as shown in FIG. 6 by dotted lines. Although not shown, it may be understood that the relationship reverses, and the slope becomes higher.

Therefore, when the wheel speed is high, the adjustment of the parameters are performed so that the values of n remain as they are, the threshold value for $-R\omega'_Q$ becomes larger, for example increasing from 0.5 G to 0.7 G. In the opposite case, the adjustments are made in the opposite way. It is also permissible for high wheel speeds, the adjustments may be made such that the threshold value can be left as is, and the value of n may be made larger from 0.3 in the above case to 0.35 for example. In the opposite case, the opposite adjustments should be made.

As explained above, by setting the threshold value of $-R\omega'_Q$ for n to be smaller than that determined by equation (4), and applying the above adjustment as needed, it becomes possible to provide a control action based on the sign of k but also the value of k.

Next, a second embodiment of antiskid control method and a device based on the method will be explained in the following with reference to FIGS. 10(A), 10(B), 10(C), 11(A), 11(B), 11(C), 12(A), 12(B) and 12(C).

The second method is similar to that of the first method, in which the axial torque inclusive of the brake torque is increased linearly with time, during the period of time from the wheel acceleration following the first pressure reduction to wheel deceleration.

Figure 10A:
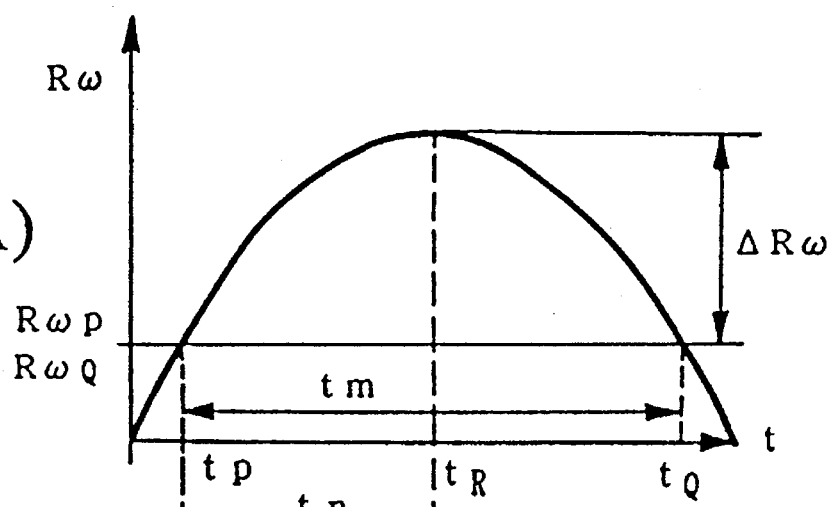
FIG. 10(A) shows the relationship between wheel speed and time according to the second and third embodiments in which k=0.
Figure 10B:
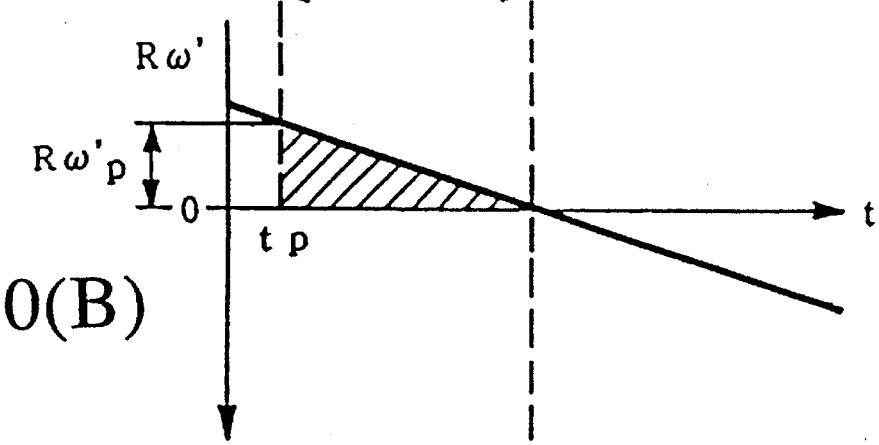
FIG. 10(B) shows the relationship between wheel acceleration and time according to the second and the third embodiments in which k=0.
Figure 10C:
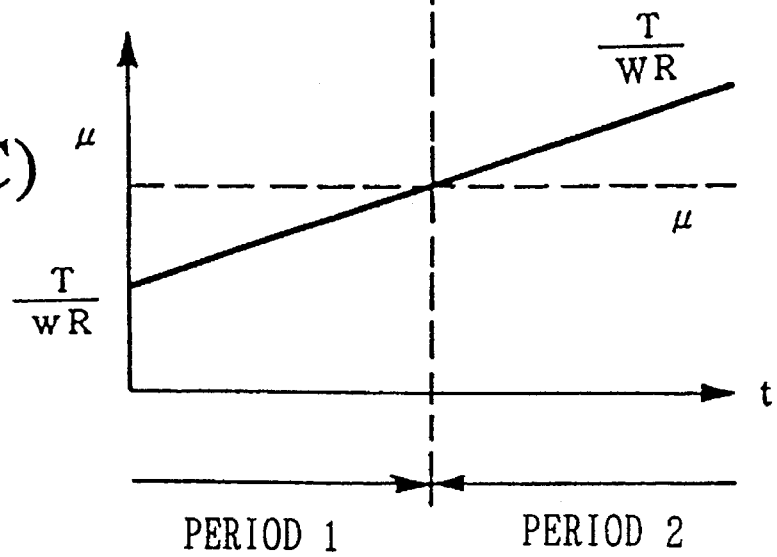
FIG. 10(C) shows the relationship between axial torque and time according to the second and the third embodiments in which k=0.

First, when k=0 (refer to FIGS. 10(A), 10(B) and 10(C)), the control device memorizes the value of the wheel speed $R\omega_P$ at time $t_P$ when the wheel acceleration was a value $R\omega'_P$, and starts the timer from this point on. It then measures the time period $t_m=(t_Q-t_P)$, from time $t_P$ to time $t_Q$ when the wheel speed $R\omega$, after having gone through the period of acceleration, once again becomes equal to $R\omega_P$ (i.e. $R\omega_P = R\omega_Q$). At the same time, it memorizes the maximum difference, $\Delta R\omega$, between $R\omega$ and the stored $R\omega_P$ which occurs during the above-mentioned time period. In other words, the difference is between the value of the wheel speed which is generated at $R\omega'=0$ and the memorized wheel speed $\omega p$.

In this case, since $R\omega_P = R\omega_Q$, therefore, by substituting $t_m = (t-t_0)$ in the above equation (3):

$$R\omega_P = R\omega_Q = R\omega_P + R\omega'_P \cdot (t_m - 1)/(2 \cdot A \cdot t_m^2). \quad (5)$$

Therefore, $$A = 2R\omega'_P/t_m. \quad (6)$$

Furthermore, obtaining the time of detection of $\Delta R\omega$ when $R\omega'=0$ from equation (2); since $R\omega'=0=R\omega'_P - A \cdot t$, therefore, $$t = R\omega'_P/A. \quad (7)$$

The value of $\Delta R\omega$ at $R\omega'=0$ is obtained from equation (3) by substituting $R\omega'_P/A$ in $(t-t_0)$, $$\begin{aligned}\Delta R\omega &= R\omega - R\omega_P = R\omega_P + R\omega'_P \cdot R\omega'_P/A - \\ & \quad 1/2 \cdot (R\omega'_P/A)^2 - R\omega_P \\ &= R\omega'_P \cdot R\omega'_P/A - 1/2 \cdot A(R\omega'_P/A)^2 \\ &= 1/2 \cdot (R\omega'_P)^2/A.\end{aligned}$$

From equation (6)

$$\begin{aligned}\Delta R\omega &= 1/2 \cdot (R\omega'_P)^2 \cdot (t_m/(2R\omega'_P)) \quad (8) \\ &= 1/4 \cdot (R\omega'_P \cdot t_m)\end{aligned}$$

That is, $$\Delta R\omega/(R\omega'_P \cdot t_m) = 0.25.$$

Therefore, for the case of k>0 (refer to FIGS. 11(A), 11(B) and 11(C), the value of $\Delta R\omega/t_n$ is smaller than that for the case when k=0. Also, when k>0, $t_m > 2t_n$ and when k=0, $t_m = 2t_n$, and ultimately, the relationship becomes $\Delta P\omega/(R\omega'_P \cdot t_m) < 0.25$. In these cases, the value of $\Delta R\omega$ when k>0 is represented by the hatched area in FIG. 11(B), and the value of $\Delta R\omega$ when k=0 is represented by the hatched area in FIG. 10(B).

For the case of k=0 (refer to FIG. 12(A), 12(B) and 12(C), and when k=0 is the same as $R\omega'_P$, the value of $\Delta R\omega/t_n$ for k=0 is larger than that when k=0, and also when k<0, $t_m < 2t_n$, and when k=0 $t_m = 2t_n$. Therefore, $\Delta R\omega/(R\omega'_P \cdot t_m) > 0.25$. In these cases, the value of $\Delta R\omega$ when K=0 corresponds to the hatched area in FIG. 10(B), and the value of $\Delta R\omega$ when k<0 corresponds to the hatched area in FIG. 12(B).

Thus, by evaluating the value of $\Delta R\omega/(R\omega'_P \cdot t_m)$, the magnitude and the polarity of k values can be determined.

The control steps of the device based on the method of control of the second embodiment will be changed from those in the first embodiment as follows.

In step S9, $\Delta R\omega$ will be detected and $t_m$ will be measured.

In step S10, it decides whether $R\omega = R\omega_P$.

In step S11, it performs a comparison of the threshold value of $\Delta R\omega/(R\omega'_P \cdot t_m)$. In the above case, this value is 0.25.

In the above case, to control the value of k to be near 0, the threshold value showed be chosen slightly lower, for example, at 0.20, than in the above case.

As explained above, the effects obtained in the first embodiment is reproduced in the second embodiment also.

Next, a third embodiment will be explained with reference to FIGS. 10(A), 10(B), 10(C), 11(A), 11(B), 11(C), 12(A), 12(B) and 12(C).

The method of the third embodiment is similar to the cases of first and second embodiments, and is based on a linear increase in the axial torque inclusive of the brake torque, during the period of time between the time of acceleration of the wheel due to the first pressure reduction to deceleration of the wheel.

First, when k=0 (refer to FIGS. 10(A), 10(B) and 10(C), the control device memorizes the value of the wheel speed $R\omega_P$ at time $t_P$ when the wheel acceleration was a value $R\omega'_P$, and starts the timer from this point on. It then measures the time period $t_m = (t_R - t_P)$, from time $t_P$ to time $t_R$ when the wheel acceleration $R\omega'$ becomes 0. At the same time, it memorizes the difference, $\Delta R\omega$, between the wheel speed $R\omega$ and the stored wheel speed $R\omega_P$ which occurs during the above-mentioned time period. In other words, the difference is between the value of the wheel speed which is generated at $R\omega'=0$ and the memorized wheel speed $\omega_P$.

From equation (2), at time $t_R$, $$R\omega'_R = R\omega'_P - A \cdot t_n = 0, \text{ therefore, } A = R\omega'_P/t_n.$$

The value of $AR\omega$ is obtained from equation (3), $$\begin{aligned}\Delta R\omega &= R\omega_R - R\omega_P \\ &= R\omega_P + R\omega'_P \cdot (t_n - 1)/2xA \cdot t_n^2 - R\omega_P \\ &= 1/2 \cdot (R\omega'_P \cdot t_n).\end{aligned}$$

Therefore, $$\Delta R\omega/((R\omega'_P \cdot t_n)) = 0.5$$

It follows that in the case of k>0, because the value of $\Delta R\omega/t_n$ is smaller than that when k=0, $\Delta R\omega/((R\omega'_P \cdot t_n)) = 0.5$ is obtained. The value of $\Delta R\omega$ when k>0 represents the hatched area in FIG. 11(B), and the value of $\Delta R\omega$ when k=0 represents the hatched area in FIG. 10(B).

For the case of k<0 (refer to FIGS. 12(A), 12(B) and 12(C), because the value of $\Delta R\omega/t_n$ is larger than that when k=0, $\Delta R\omega/((R\omega'_P \cdot t_n)) = 0.5$ is obtained. The value of $\Delta R\omega$ when k>0 represents the hatched area in FIG. 12(B), and the value of $\Delta R\omega$ when k=0 represents the hatched area in FIG. 10(B).

Therefore, by evaluating the values of $\Delta R\omega/((R\omega'_P \cdot t_n))$, the magnitude and the polarity of the values of k can be determined.

The operating steps for the device based on the method of the third embodiment, the following changes are instituted.

Step S9 is replaced with the step of determining $\Delta R\omega$, and measuring $t_n$.

Step S10 is replaced with determining whether $R\omega'=0$.

Step S11 is replaced with comparing with the threshold value of $\Delta R\omega/(R\omega'_P \cdot t_n)$.

In this case, to control the device so that the value of k is positive and close to 0, the threshold value is set slightly lower than the above value (for example 0.45).

As explained above, the evaluation method of the third embodiment provides the same effect as that presented in the first embodiment.

In the first to the third embodiments the examples were based on a control modulator performed switching operations of pressure reducing and second pressuring functions. It is also permissible to provide two em valves in one brake control circuit, and switch functions of pressure reducing/ holding/repressuring, and other like arrangements. When using a modulator capable of switching between pressure reducing/holding/repressuring, the control can be arranged so as to hold the brake pressure when the value of k is judged to be between 0 and slightly above 0.

In the following, a fourth embodiment will be explained with reference to the Figures.

Figure 1:
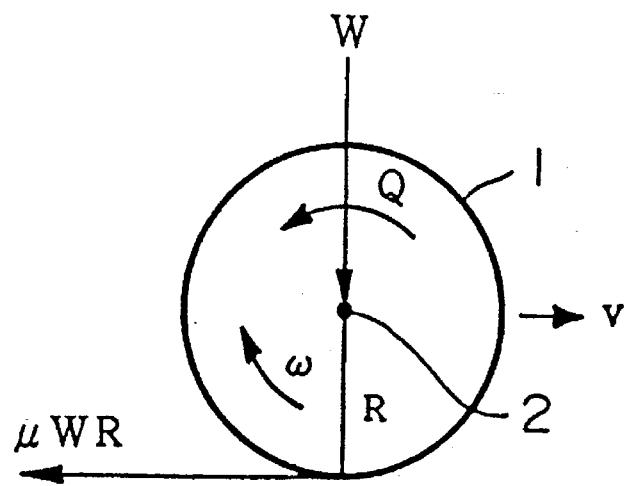
FIG. 1 is an illustration of a model for the motion of a wheel used in the present invention.

As shown in FIG. 1, the designations are similar to those used in the first to third embodiments. The load $w_0$ acts on a wheel 1 of an effective radius R, and the rotational wheel speed is $\omega$ and the derivative of the wheel acceleration is $\omega'$, the moment of inertia of the wheel 2 is I, the torque on the wheel axis is P, and the coefficient of friction between the wheel 1 and the road is designated by $\mu$.

Figure 13:
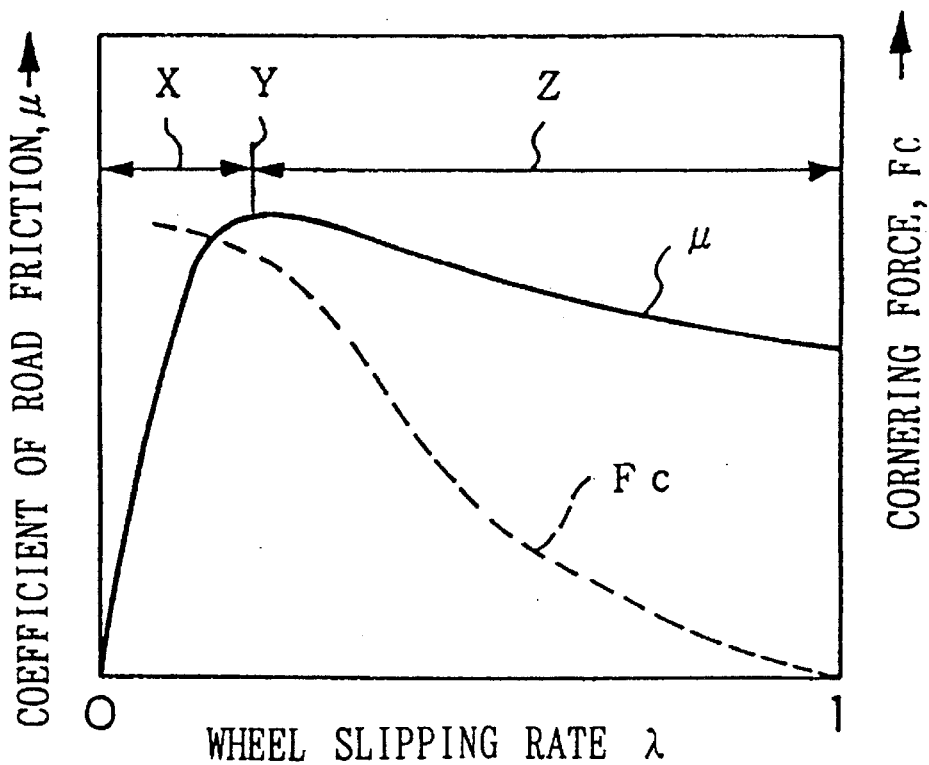
FIG. 13 shows the relationship between the coefficient of road friction μ and the cornering force Fc to the slipping rate for the wheel.

Generally, the relationship between the slipping rate $\lambda$ and the coefficient of road friction is as in FIG. 13, showing that the change rate $k=d\mu/d\lambda$ changes so that $k>0$ in the range X, $k=0$ at the point Y, $k<0$ in the range of Z. The slipping rate is obtained from $\lambda=1-R\omega/v$ where $R\omega$ is the wheel speed computed from the wheel speed detector signal (to be described later), and v is the pseudo vehicle speed deduced from the wheel speed.

Taking the midpoint at Y where $k=0$, the control device decides that in the X range where the slipping rate $\lambda$ is small, the vehicle is in a stable condition, and conversely, in the Z range where the slipping rate $\lambda$ is large the vehicle is in an unstable condition, and the wheel is tending to lock up because of the lowering of the cornering force Fc shown by the dotted line in FIG. 13.

Figure 14:
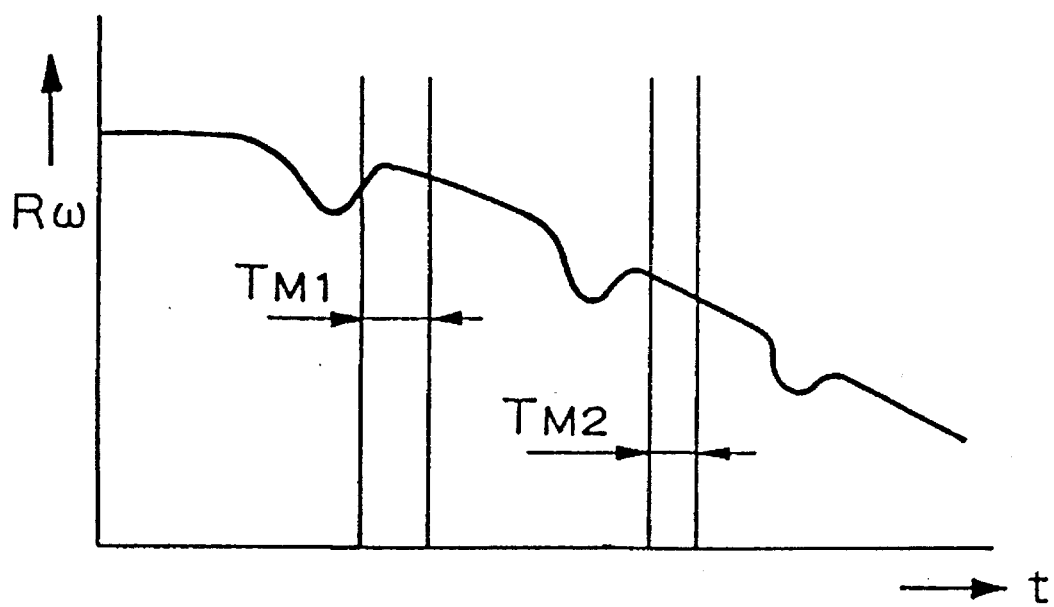
FIG. 14 shows the relationship between the wheel speed Rω and the lapse of time according to the fourth embodiment of antiskid control operation.

Here, the relationship between the time t and the wheel speed $R\omega$ during the antiskid control operation, is as shown in FIG. 14. In this embodiment, the axial inclusive of the brake torque is increased linearly with time during the antiskid control operation, by reducing the fluid pressure in the wheel cylinder followed by the second increase in the pressure. There are two control methods: the first method is to control the timing of second reduction during the period $T_{M1}$ during which the wheel changes from the accelerating condition to the decelerating condition; the second method is to control the timing of the second reduction during the period $T_{M2}$ in which the wheel is totally in the deceleration condition. Controlling the initiation timing for pressure reduction in the early phase of antiskid control and the timing for switching from pressure reducing phase to the pressure increase phase can be carried out in the conventional way.

First is the case of control for increasing the brake torque linearly with time by reducing the fluid pressure in the wheel cylinder followed by the second pressurization. In the method of control based on period $T_{M1}$, during which the wheel 1 is changing from acceleration to deceleration without pulsations in the wheel speed, the evaluation method is based on k. To calculate the change rate k, a method is described below.

Given that the load on the wheel is $w_0$ the effective radius of the wheel is R, the angular speed of the wheel is $\omega$ the derivative of the angular speed is $\omega'$, the moment of inertia of I and the torque on the axis P, and the gravitational acceleration is g; then, $$R\omega'=(g/C_0)\cdot\{\mu-P/(W_0/g)\} \quad (11)$$

where $C_0=I/(W_0R^2/g)$.

At time $t_n$ $$R\omega'_n=(g/C_0)\cdot[\mu_n-\{P/(W_0/g)\}_n] \quad (12)$$

As in the previous embodiments, the wheel slipping rate $\lambda$, the wheel speed $R\omega$ and the vehicle speed v are related by:

$$\lambda=1-(R\omega/v) \quad (13)$$

Assuming that the vehicle speed v is constant within a small time interval, and differentiating both sides with respect to t, $$\lambda'=-R\omega'/v \quad (14)$$

The change rate k is given by its definition to be $$k=\mu'/\lambda' \quad (15)$$

From equations (14) and (15), $$\mu'=-(k/v)\cdot R\omega' \quad (16)$$

Figure 15:
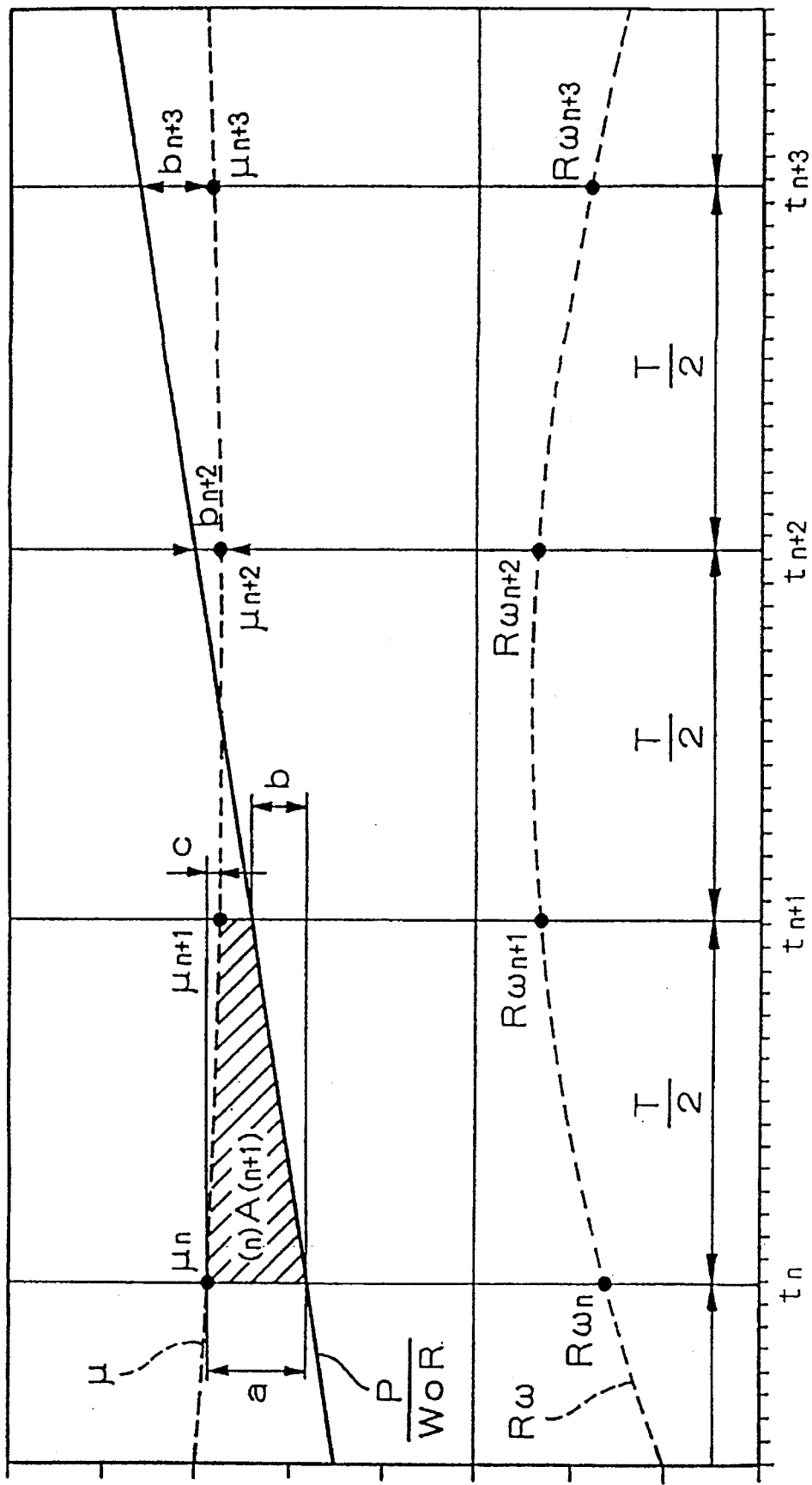
FIG. 15 shows the relationship between the wheel speed Rω without wheel speed pulsations, the coefficient of road friction and the axial control torque $P/(W_0R)$, for the case of the wheel speed changing from acceleration to deceleration during the antiskid control the fourth embodiment of the antiskid control method.

FIG. 15 shows the interrelationship of the wheel speed $R\omega$, the road friction $\mu$, and the axial control torque $P/(W_0/g)$ during the period $T_{M1}$ during which the wheel changes from acceleration to deceleration during the antiskid control operation. During this period, after reducing the fluid pressure, the axial torque is controlled so as to increase at a constant rate.

In FIG. 15, the terms in the square brackets, road friction $\mu$ and the axial $P/(W_0/g)$, are given as dimensionless numbers. Here, when $\mu>P/(W_0/g)$, the wheel accelerates, and when $\mu<P/(W_0/g)$, the wheel decelerates.

The wheel speed change $(R\omega_{n+1}-R\omega_n)$ during the time interval between $t_n$ and $t_{n+1}$, is given from equation (12) as the $g/C_0$ times the area $_{(n)}A_{(n+1)}$ bounded by $\mu$ curve and the $P/(W_0/g)$ line, therefore, $$R\omega_{n+1}-R\omega_n=(g/C_0)\cdot{}_{(n)}A_{(n+1)} \quad (17)$$

Also, from equations (16) and (17), $$\mu n-\mu n+1=(k/v)\cdot(R\omega_{n+1}-R\omega_n)=(k/v)\cdot(g/C_0)\cdot{}_{(n)}A_{(n+1)} \quad (18)$$

The area $_{(n)}A_{(n+1)}$ bounded by the $\mu$ curve and $P/(W_0/g)$ line is expressed by:

$$_{(n)}A_{(n+1)}\approx a(T/2)-b(\frac{1}{2})(T/2)-c(\frac{1}{2})(T/2) \quad (19)$$

where a is the interval between $\mu_n$ and $P/(W_0R)_n$; b is the interval between $\{P/(W_0R)\}_{n+1}$ and $\{P/(W_0R)\}_n$; and c is the interval between $\mu_n$ and $\mu_{n+1}$ and the sampling interval is (T/2).

Here, a represents $\mu_n-\{P/(W_0R)\}_n$ at time $t_n$, and from equation (12)

$$a=(C_0/g)\cdot R\omega'_n \quad (20)$$

Also, b represents the axial control torque difference at times $t_n$ and $t_{n+1}$, and the axial control torque is rising at a constant rate, therefore $$b=\{(Q/w_0R)\}\cdot(T/2) \quad (21)$$

Also, c represents the difference between time $t_n$ and $t_{n+1}$ and by taking a brief time T, $$c = (\mu_n - \mu_{n+1}) = (k/v) \cdot (R\omega_{n+1} - R\omega_n) \approx (k/v) \cdot R\omega'_n \cdot (T/2) \quad (22)$$

$$\mu_n = \mu_{n+1} \approx (k/v) \cdot (g/C_0) \cdot [(C_0/g) \cdot R\omega'_n \cdot (T/2) -$$

$$(1/2) \cdot \{Q/(W_0R)\} \cdot (T/2)^2 - (1/2) \cdot (k/v) \cdot R\omega'_n \cdot (T/2)^2] =$$

$$(k/v) \cdot (T/2) \cdot [R\omega'_n + (v/k) \cdot \{Q/(W_0R)\}] \cdot$$

$$\{1 - (1/2) \cdot (k/v) \cdot (g/C_0) \cdot (T/2)\} - \{Q/(W_0R)\} \cdot (T/2)$$

Therefore, $$\{Q/(W_0R)\} \cdot (T/2) + (\mu_n - \mu_{n+1}) \approx \quad (23)$$

-continued $$(k/v) \cdot (T/2) \cdot [R\omega'_n + (v/k) \cdot \{Q/(W_0R)\}] \cdot$$
$$\{1 - (1/2) \cdot (k/v) \cdot (g/C_0) \cdot (T/2)\}$$

Also, the relationship between the axial control torque $\{(P/(W_0R)\}_n$ at time $t_{n+1}$ and the control torque $\{(P/(W_0R)\}_{n+1}$ at time $t_{n+1}$ is expressed as:

$$\{(P/(W_0R)\}_{n+1} = \{(P/(W_0R)\}_n + \{(Q/(W_0R)\} \cdot (T/2) \quad (24)$$

Equation (12) at time $t_{n+1}$ becomes:

$$R\omega'_{n+1} = (g/C_0) \cdot [\mu_{n+1} - \{(P/W_0R) + (Q/(W_0R)) \cdot (T/2)\}] \quad (25)$$

Taking the difference between equation (12) and (25), $$R\omega'_n - R\omega'_{n+1} = (g/C_0) \cdot \{\mu_n - \mu_{n+1} + (Q/(W_0R)) \cdot (T/2)\}$$

$$\{Q/(W_0R)\} \cdot (T/2) + (\mu_n - \mu_{n+1}) = (C_0/g) \cdot (R\omega'_n - R\omega'_{n+1}) \quad (26)$$

Because the left side of equations (23) and (26) are the equal, $$(C_0/g) \cdot (R\omega'_n - R\omega'_{n+1}) \approx$$
$$(k/v) \cdot (T/2) \cdot [R\omega'_n + (v/k) \cdot \{Q/(W_0R)\}] \cdot$$
$$\{1 - (1/2) \cdot (k/v) \cdot (g/C_0) \cdot (T/2)\}$$

therefore, $$(R\omega'_n - R\omega'_{n+1})/[R\omega'_n + (v/k) \cdot \{Q/(W_0R)\}] = (k/v) \cdot (g/C_0) \cdot (T/2) \cdot \{1 - (\frac{1}{2}) \cdot (k/v) \cdot (g/C_0) \cdot (T/2)\}$$

Subtracting both sides from 1

$$[R\omega'_{n+1} + (v/k) \cdot \{Q/(W_0R)\}]/[R\omega'_n + (v/k) \cdot \{Q/(W_0R)\}] = 1 - (k/v) \cdot (g/C_0) \cdot (T/2) \cdot \{1 - (\frac{1}{2}) \cdot (k/v) \cdot (g/C_0) \cdot (T/2)\} \quad (27)$$

Since k, v and $C_0$ are approximately constant during the time between $t_n$ and $t_{n+1}$, equation (27) maintains a constant value.

Next, equation (23) is valid for the next sampling period, i.e., $t_{n+1}$, $t_{n+2}$ (sampling interval is the same for $t_n$, $t_{n+1}$, $t_{n+2}$, $t_{n+3}$, $t_{n+4}$ etc.), therefore, $$\{Q/(W_0R)\} \cdot (T/2) + (\mu_{n+1} - \mu_{n+2}) \approx \quad (28)$$
$$(k/v) \cdot (T/2) \cdot [R\omega'_{n+1} + (v/k) \cdot \{Q/(W_0R)\}] \cdot$$
$$\{1 - (1/2) \cdot (k/v) \cdot (g/C_0) \cdot (T/2)\}$$

Here, since k, v, $C_0$ are constant during this time period between $t_n$ and $t_{n+2}$ also, by taking a ration of equations (23) and (28), the following equation (29) is obtained.

$$[\{Q/(W_0R)\} \cdot (T/2) + (\mu_n - \mu_{n+1})]/[\{Q/(W_0R)\} \cdot (T/2) + (\mu_{n+1} - \mu_{n+2})] = [R\omega'_n + (v/k) \cdot \{Q/(W_0R)\}]/[R\omega'_{n+1} + (v/k) \cdot \{Q/(W_0R)\}] \quad (29)$$

The right side of equation (29) maintains a constant value as shown already for equation (27).

Equation (29) is applicable to the next time period between $t_{n+1}$ and $t_{n+3}$, therefore it leads to equation (30).

$$[\{Q/(W_0R)\} \cdot (T/2) + (\mu_n - \mu_{n+1})]/[\{Q/(W_0R)\} \cdot (T/2) + (\mu_{n+1} - \mu_{n+2})] = [\{Q/(W_0R)\} \cdot (T/2) + (\mu_{n+1} - \mu_{n+2})]/[\{(Q/(W_0R)\} \cdot (T/2) + (\mu_{n+2} - \mu_{n+3})] \quad (30)$$

Developing equation (30) leads to equation (31) below.

$$-\{Q/(W_0R)\} \cdot (T/2) \cdot \{(\mu_n - \mu_{n+1}) + (\mu_{n+2} - \mu_{n+3}) - 2(\mu_{n+1} - \mu_{n+2})\} = (\mu_n - \mu_{n+1}) \cdot (\mu_{n+2} - \mu_{n+3}) - (\mu_{n+1} - \mu_{n+2})^2 \quad (31)$$

From equation (16), the following equation (32) can be derived.

$$k = v \cdot \{Q/(W_0R)\} \cdot (T/2) \cdot [(R\omega_n - R\omega_{n+1}) + (R\omega_{n+2} - R\omega_{n+3}) - 2(R\omega_{n+1} - R\omega_{n+2})]/[(R\omega_n - R\omega_{n+1}) \cdot (R\omega_{n+2} - R\omega_{n+3}) - (R\omega_{n+1} - R\omega_{n+2})^2] \quad (32)$$

In this embodiment, when the value of the change rate k calculated by equation (32) becomes lower than the predetermined threshold value (for example 0), the controller begins a pressure reducing phase subsequent to second pressuring phase of the antiskid operation.

During the linear increase with time of the axial control torque inclusive of the brake torque following the second pressuring phase of the antiskid control operation, the change rate k is used to control timing of applying antiskid control regardless of the presence or absence of wheel speed pulsations, without performing second reduction of wheel cylinder pressure in the time period $t_{M1}$. There are two methods for calculating the change rate k. This will be explained in the following.

First, when there are no pulsations in the wheel speed, the above equation (30) is expanded with respect to time intervals, $t_{n+1}$ to $t_{n+4}$, the following equation (33) is obtained.

$$[\{Q/(W_0R)\} \cdot (T/2) + (\mu_n - \mu_{n+1})]/[\{Q/(W_0R)\} \cdot (T/2) +$$
$$(\mu_{n+1} - \mu_{n+2})] = [\{Q/(W_0R)\} \cdot (T/2) + (\mu_{n+1} -$$
$$\mu_{n+2})]/[\{Q/(W_0R)\} \cdot (T/2) + (\mu_{n+2} - \mu_{n+3})] = [\{Q/(W_0R)\} \cdot$$
$$(T/2) + (\mu_{n+2} - \mu_{n+3})]/[\{Q/(W_0R)\} \cdot (T/2) + (\mu_{n+3} - \mu_{n+4})]$$

Equation (33) leads further to:

$$[\{(Q/(W_0R)) \cdot (T/2) + (\mu_n - \mu_{n+1})\} + \{(Q/(W_0R)) \cdot (T/2) +$$
$$(\mu_{n+1} - \mu_{n+2})\}]/[\{(Q/(W_0R)) \cdot (T/2) + (\mu_{n+1} - \mu_{n+2})\} +$$
$$\{(Q/(W_0R)) \cdot (T/2) + (\mu_{n+2} - \mu_{n+3})\}] = [\{(Q/(W_0R)) \cdot (T/2) +$$
$$(\mu_{n+1} - \mu_{n+2})\} + \{(Q/(W_0R)) \cdot (T/2) + (\mu_{n+2} -$$
$$\mu_{n+3})\}]/[\{(Q/(W_0R)) \cdot (T/2) + (\mu_{n+2} - \mu_{n+3})\} +$$
$$\{(Q/(W_0R)) \cdot (T/2) + (\mu_{n+3} - \mu_{n+4})\}]$$

This can be further expanded to obtain equation (34) as follows.

$$-\{Q/(W_0R)\} \cdot T \cdot \{(\mu_n - \mu_{n+2}) + (\mu_{n+2} - \mu_{n+4}) - 2(\mu_{n+1} - \mu_{n+3})\} = (\mu_n - \mu_{n+2}) \cdot (\mu_{n+2} - \mu_{n+4}) - (\mu_{n+1} - \mu_{n+3})^2$$

Equation (34) is similar to equation (31), and in a similar manner to deriving of equation (32) from equation (31), equation (16) is applied to this equation (34) to obtain equation (35) shown below.

$$k = v \cdot \{Q/(W_0R)\} \cdot T \cdot [(R\omega_n - R\omega_{n+4}) - 2(R\omega_{n+1} - R\omega_{n+3})]/[(R\omega_n - R\omega_{n+2}) \cdot (R\omega_{n+2} - R\omega_{n+4}) - (R\omega_{n+1} - R\omega_{n+3})^2]$$

Because of the vibrations of the spring-loaded section of the vehicle, leading to fluctuations in the wheel loading, and if the wheel speed pulsations occur, the equation of motion of the wheel can be expressed by equation (36).

$$R\omega' = (g/C_0) \cdot [\alpha\mu - [P/(W_0R)]] \quad (36)$$

where the change in the wheel loading is $W = \alpha W_0$, and $\alpha = 1 + a \cdot \sin^2 \pi f_a t$ (where both a and $f_a$ are constants), and $C_0 = I/(W_0 R^2/g)$.

Figure 16:
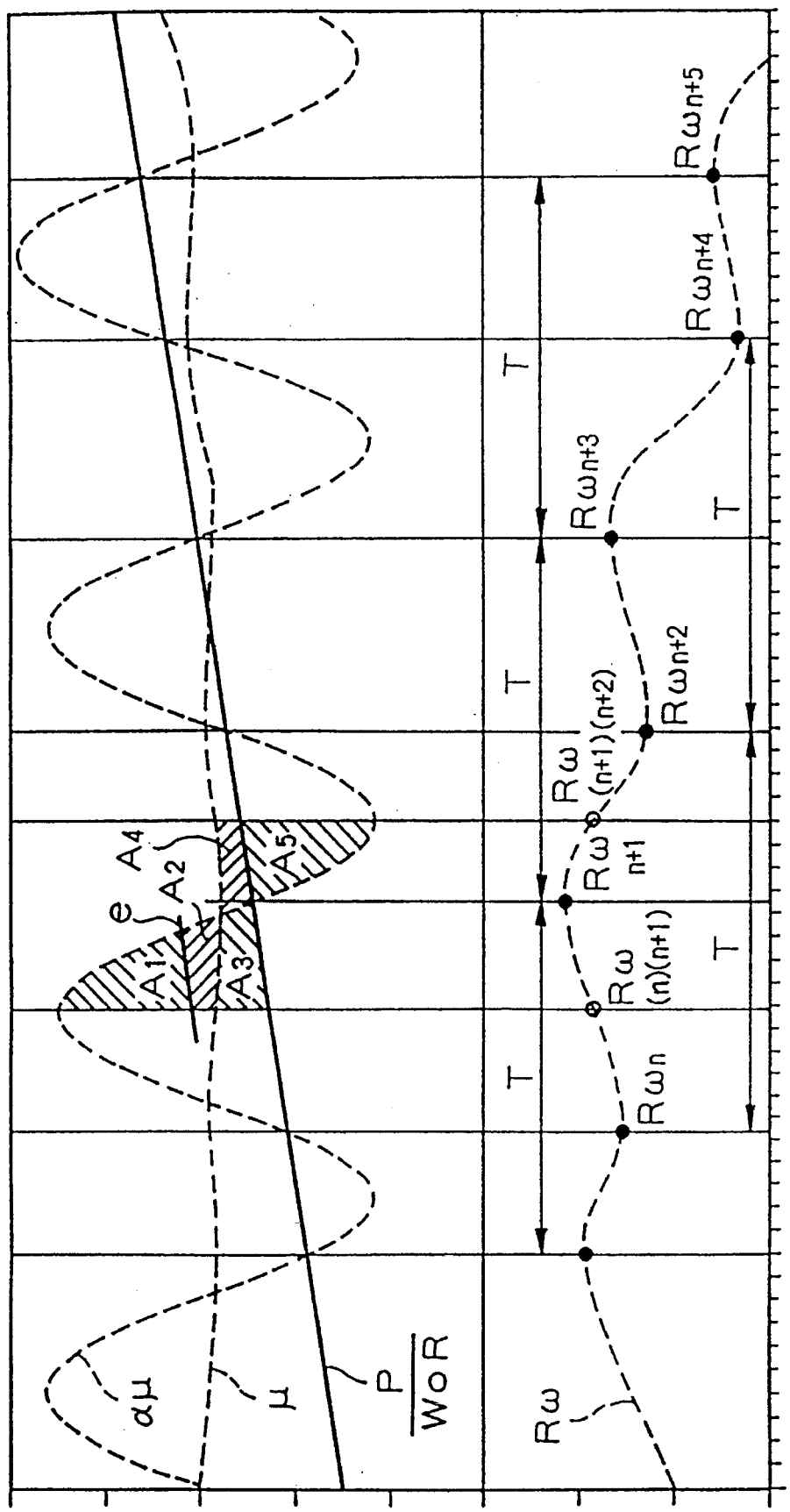
FIG. 16 shows the relationship between the wheel speed Rω with wheel speed pulsations caused by changes in the load on the wheel, the coefficient of road friction and the axial control torque $P/(W_0R)$, for the case in which the wheel speed is changing from acceleration to deceleration during the antiskid control operation of the fourth embodiment.

FIG. 16 shows the relationship among $R\omega$, $\alpha\mu$, $\mu$ and $P/(W_0R)$ when the wheel speed pulsations occur as a result of the wheel loading change. As clear from equation (36), the wheel speed $R\omega$ can accelerate or decelerate depending on the value of $\alpha\mu - P/(W_0R)$, and reaches maximum or minimum when $\alpha\mu = P/(W_0R)$.

Here, the average value of the wheel speeds $R\omega_n$ at time $t_n$ and $R\omega_{n+1}$ at time $t_{n+1}$ can be regarded to be the value at the inflection point, therefore, the wheel speed at this point may be represented by $R\omega_{(n)(n+1)}$. The difference between the wheel speeds, $R\omega_{(n)(n+1)}$ and $R\omega_{(n+1)(n+2)}$ can be obtained from equation (36) as the area bounded by $\alpha\mu$ curve and the $P/(W_0R)$ line multiplied by $g/C_0$.

In FIG. 16, the boundary line e between the area $A_1$ and $A_2$ is drawn so that $A_1 = A5$ where A1 is the wheel speed at time $tn_1$ and $A_5$ is the wheel speed at time $t_{n+5}$. The difference in wheel speeds can be expressed as in equation (37).

$$R\omega_{(n+1)(n+2)} - R\omega_{(n)(n+1)} = (g/C_0) \cdot \{(A_1 + A_2 + A_3) - A_5\} \quad (37)$$

However, considering that the coefficient of road friction $\mu$ changes gradually (refer to FIG. 18), so the average value of $\mu$ may be considered to be $\mu_{(n)(n+1)} \approx \mu_{(n+1)(n+2)}$, then $A_2 \approx A_4$, and $$R\omega_{(n+1)(n+2)} - R\omega_{(n)(n+1)} \approx (g/C_0) \cdot (A_3 + A_4) \quad (38)$$

This result is similar to that shown in FIG. 15, and $R\omega_{(n+1)(n+2)} - R\omega_{(n)(n+1)}$ is equal to the area bounded by the $\mu$ curve and the $P/(W_0R)$ line multiplied by $(g/C_0)$.

Next, if pulsations are generated in the wheel speed caused by such factors as engine speed variations affecting the wheel torque, expressing the axial torque as: $\{P/(W_0R)\} + b \cdot \sin^2 \pi f_b t$ where both b, $f_b$ are constants, the equation of motion for the wheel becomes as in equation (39).

$$R\omega' = (g/C_0) \cdot [\mu - \{(P/(W_0R)) + (b \cdot \sin^2 \pi f_b t)\}] \quad (39)$$

Figure 17:
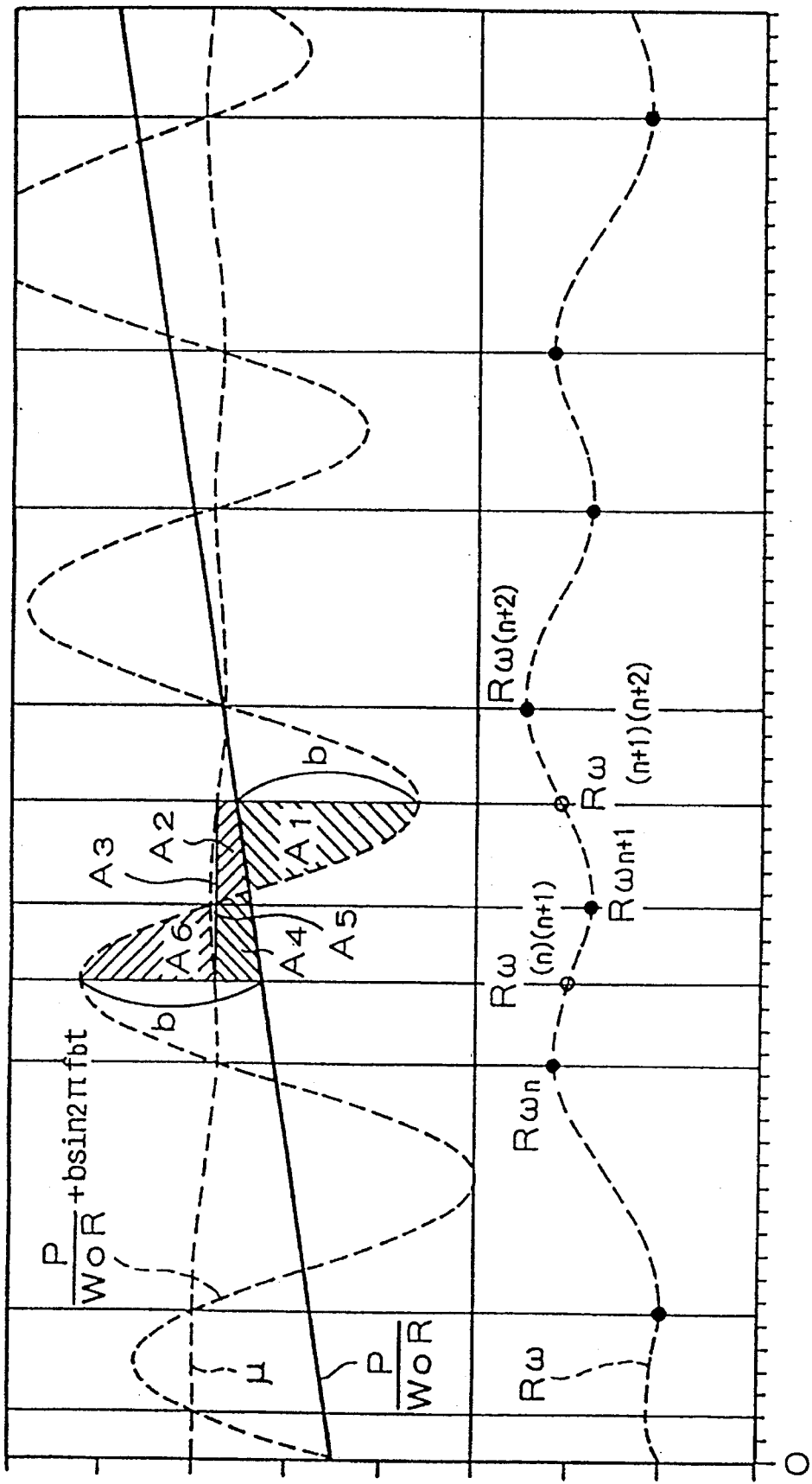
FIG. 17 shows the relationship between the wheel speed Rω with wheel speed pulsations caused by changes in the axial torque, the coefficient of road friction and the axial control torque $P/(W_0R)$, for the casein which the wheel speed is changing from acceleration to deceleration during the antiskid control control operation in the fourth embodiment.

FIG. 17 shows how $R\omega$, $\mu$, $\{P/(W_0R)\} + (b \cdot \sin^2 \pi f_b t)$ and $P/(W_0R)$ are related to each other, and as clear from equation (39), the wheel speed $R\omega$ accelerates or decelerates depending on the value of $\mu - [\{P/(W_0R)\} + (b \cdot \sin^2 f_b t)]$, and reaches its maximum or minimum value when $\mu = \{(P/(W_0R)\} + (b \cdot \sin^2 f_b t)$.

In FIG. 17, when the change in $\mu$ or $P/(W_0R)$ is so small relative to b that it can be neglected, because $A_1 \approx A_4 + A_5 + A_6$, and $(A_2 + A_4) >> (A_3 + A_5)$, the following equation (40) is established.

$$\begin{aligned}
R\omega_{(n+1)(n+2)} - R\omega_{(n)(n+1)} &= (g/C_0) \cdot \{(A_1 + A_2 + A_3) - A_6\} \quad (40)\\
&\approx (g/C_0) \cdot \{(A_4 + A_5 + A_6 + A_2 + A_3) - A_6\}\\
&= (g/C_0) \cdot \{(A_2 + A_4) + (A_3 + A_5)\}\\
&\approx (g/C_0) \cdot (A_2 + A_4)
\end{aligned}$$

This is similar to the case shown in FIG. 15, and the wheel speed $R\omega_{(n+1)(n+2)} - R\omega_{(n)(n+1)}$ is equal to the area bounded by the $\mu$ curve and the $P/(W_0R)$ line multiplied by $g/C_0$.

In the above, the case of generation of wheel speed pulsations caused by spring-loaded vibration, and the case of generation of wheel speed pulsations caused by changes in the axial torque were described. In these cases, when there are wheel speed pulsations while the axial control torque is being increased linearly, the average value of the successive values of maximum or minimum wheel speed follows approximately the same route as those when there are no pulsations, if the amplitude of the pulsations is constant. Therefore, equation (32) is adequate to express the wheel speed.

Therefore, by replacing $R\omega_n$ in equation (32) with $(R\omega_n + R\omega_{n+1})/2$, the value of k can be expressed as follows.

$$k = v \cdot \{Q/(W_0R)\} \cdot (T/2) \cdot \{(1/2)/(1/4)\} \cdot [(R\omega_n - R\omega_{n+2}) + \quad (35)$$

-continued $$(R\omega_{n+2} - R\omega_{n+4}) - 2(R\omega_{n+1} - R\omega_{n+3})]/[(R\omega_n - R\omega_{n+2}) \cdot$$

$$(R\omega_{n+2} - R\omega_{n+4}) - (R\omega_{n+1} - R\omega_{n+3})^2] = v \cdot \{Q/(W_0R)\} \cdot$$

$$T \cdot [(R\omega_n - R\omega_{n+2}) + (R\omega_{n+2} - R\omega_{n+4}) -$$

$$2(R\omega_{n+1} - R\omega_{n+3})]/[(R\omega_n - R\omega_{n+2}) \cdot (R\omega_{n+2} - R\omega_{n+4}) -$$

$$(R\omega_{n+1} - R\omega_{n+3})^2] = v \cdot \{Q/(W_0R)\} \cdot T \cdot [(R\omega_n - R\omega_{n+4}) -$$

$$2(R\omega_{n+1} - R\omega_{n+3})]/[(R\omega_n - R\omega_{n+2}) \cdot (R\omega_{n+2} - R\omega_{n+4}) -$$

$$(R\omega_{n+1} - R\omega_{n+3})^2]$$

The value of change rate k calculated according to equation (35) becomes lower than the predetermined threshold value (for example 0), pressure reduction phase is started subsequent to the second increase in the pressure of the antiskid control operation is carried out.

In the above case, the sampling time T is set to be twice (T/2) when there are no pulsations, and when there are pulsations, sampling is made on the basis of an average value of the periods of pulsations.

The next is the case of antiskid operation when the entire wheel is decelerating ($\mu < P/(WR)$) without pulsations. As before the control is based on the linear increase with time in the axial control torque inclusive of the brake torque. The control timing for the second reduction in pressure during the time interval $t_{M2}$ is based on change rate k which is calculated as follows.

The condition of the vehicle when the wheel continues to decelerate without pulsations is as shown in FIG. 15 between the wheel speed $R\omega_{n+2}$ at time $t_{n+2}$ and the wheel speed $R\omega_{n+3}$ at time $t_{n+3}$, and the difference in the road friction $\mu_{n+3} - \mu_{n+2}$ can be expressed as in equation (41). Using the intervals $b_{n+2}$ of the $\mu$ curve and $b_{n+3}$ of the $P/(W_0R)$ line, the difference can be expressed as follows.

$$\mu_{n+3} - \mu_{n+2} < \{Q/(W_0R)\} \cdot (T/2) - (b_{n+3} - b_{n+2})$$

Since $b_{n+3} > b_{n+2}$ $$\mu_{n+3} - \mu_{n+2} < \{Q/(W_0R)\} \cdot (T/2) \quad (41)$$

From the relationship between equations (41) and (16), $$k < v \cdot \{Q/(W_0R)\} \cdot (T/2) \cdot \{1/(R\omega_{n+2} - R\omega_{n+3})\}$$

and replacing the subscripts n+2 with n and n+3 with n+1, the following equation (42) is obtained.

$$k < v \cdot \{Q/(W_0R)\} \cdot (T/2) \cdot \{1/(R\omega_n - R\omega_{n+1})\} \quad (42)$$

If the estimated value of k calculated from the right side of equation (42) is lower than the pre-determined threshold value (for example 0), then it assumes that the value of k is less than the threshold value, and the pressure reduction phase subsequent to the second increase in the pressure of the antiskid control operation is started.

Next, the second method of estimating the value of k for controlling the timing of pressure second pressure reduction during the period $T_{M2}$ in which the wheel as a whole is in the deceleration condition. Other conditions of the wheel remain the same as in the first method.

Figure 18:
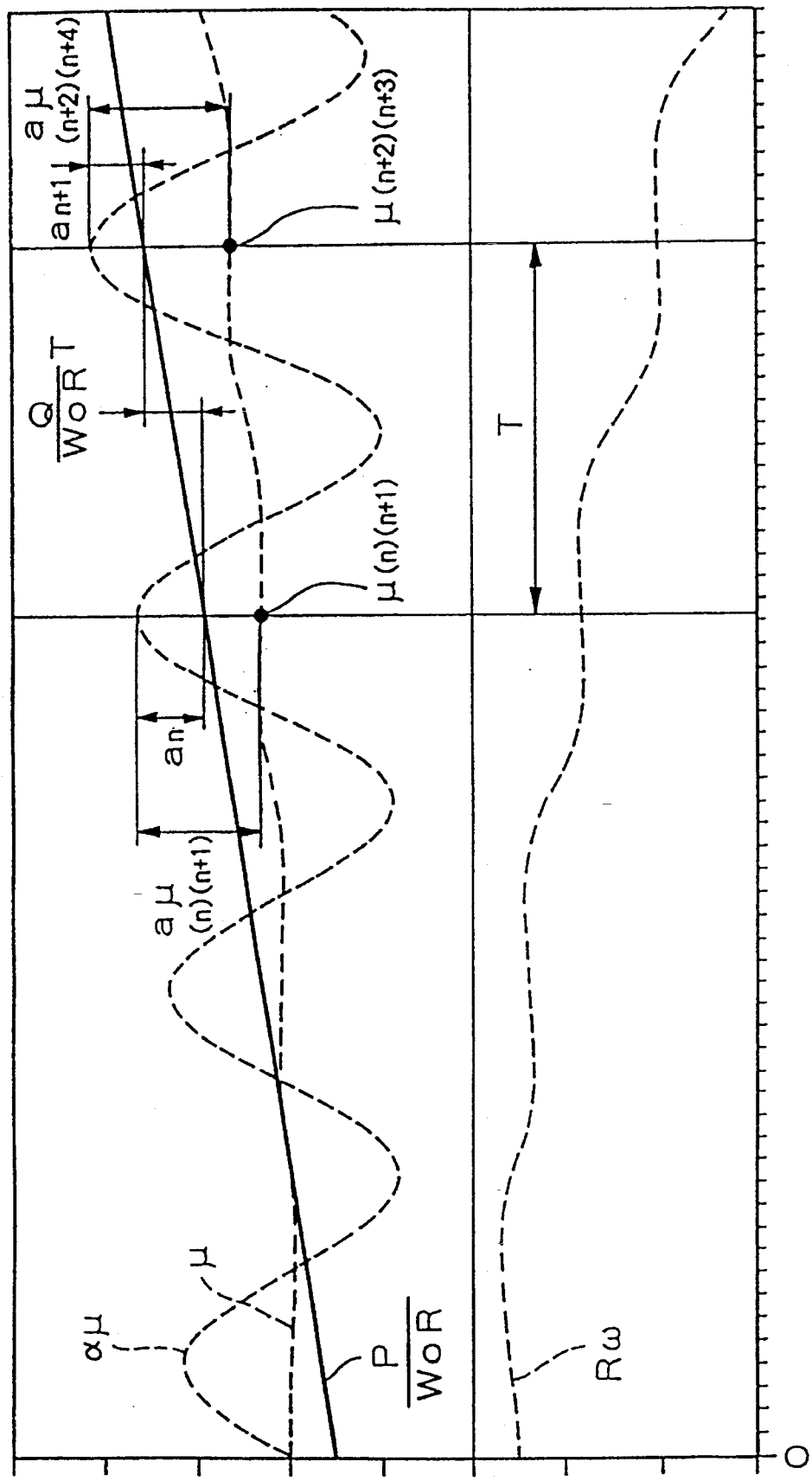
FIG. 18 shows the relationship between the wheel speed Rω with wheel speed pulsations caused by changes in the load on the wheel, the coefficient of road friction and the axial control torque $P/(W_0R)$, for the case in which the entire wheel is undergoing deceleration during the antiskid control method in the fourth embodiment.

First, when the wheel loading changes due to the spring-loaded vibrations of the wheel (referring to FIG. 18), and using the same values as before for the change in the wheel loading $W = \alpha W_\Theta$ and $\alpha = 1 + a \cdot \sin^2 \pi f_a t$ (where both a, and $f_a$ are constants), then from FIG. 18, the following expression for the road friction is obtained.

$$a \cdot \mu_{(n)(n+1)} - a_n + \{Q/(W_0R)\} \cdot (T) = (\mu_{n+2)(n+3)} - \mu_{(n)(n+1)}) + a \cdot \mu_{(n+2)(n+3)} - a_{n+1}$$

Therefore, $$\mu_{(n+2)(n+3)} - \mu_{(n)(n+1)} = \{1/(1+a)\} \cdot \{Q/(W_0R)\} \cdot (T) \cdot [1-(a_n-a_{n+1})/Q/(W_0R) \cdot T)]$$

Here, since $a_n > a_{n+1}$, $$\mu_{(n+2)(n+3)} - \mu_{(n)(n+1)} < \quad (43)$$

$$\{1/(1+a)\} \cdot \{Q/(W_0R)\} \cdot (T) < \{Q/W_0R)\} \cdot T$$

and from the relationship of this equation (43) to equation (6), it can be derived that $$k < v \cdot \{Q/(W_0R)\} \cdot T \cdot \{1/(R\omega_{(n)(n+1)} - R\omega_{(n+2)(n+3)}\} \quad (44)$$

Figure 19:
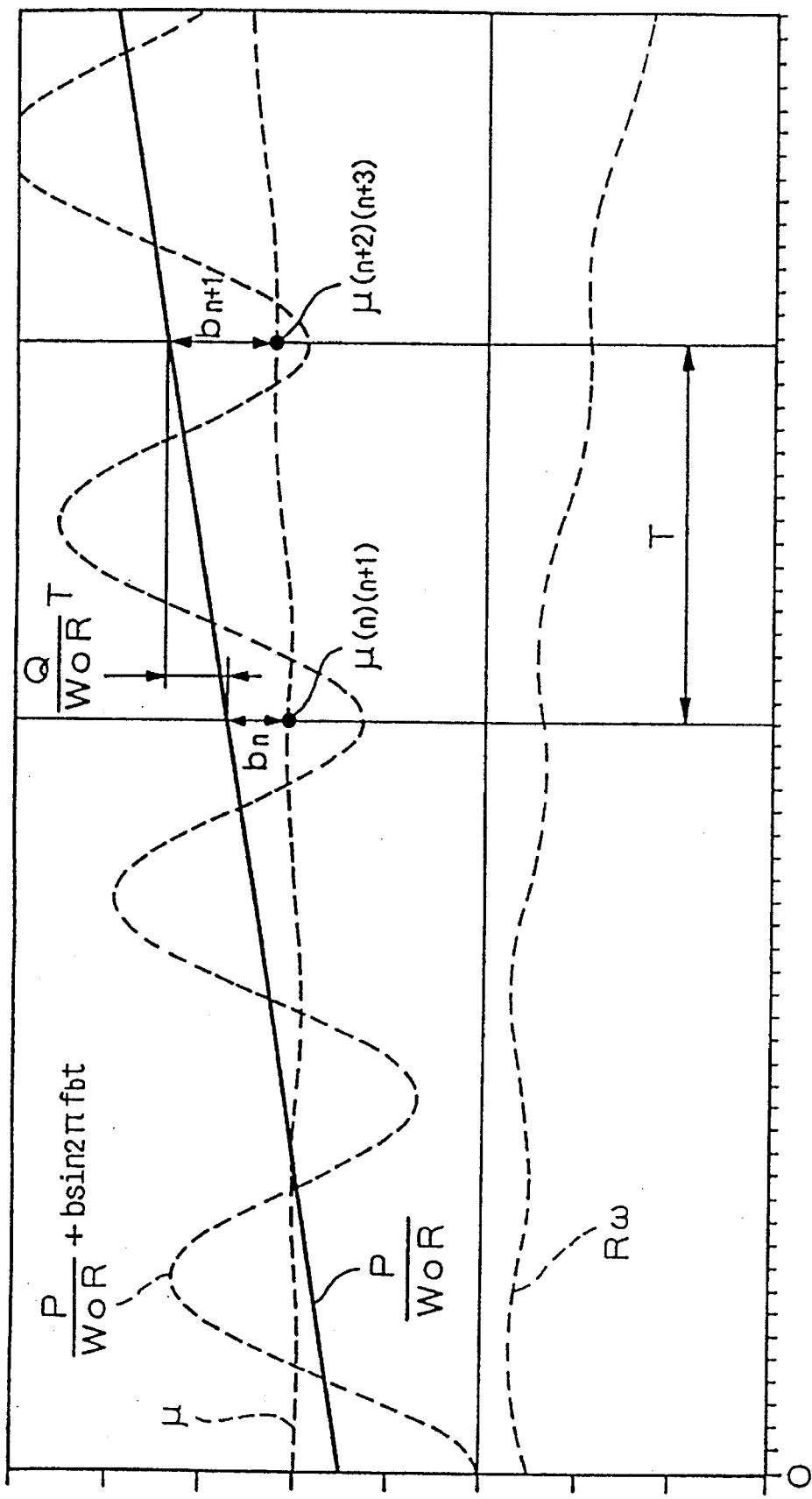
FIG. 19 shows the relationship between the wheel speed Rω with pulsations caused by changes in the axial torque, the coefficient of road friction and the axial control torque $P/(W_0R)$, for the case in which the entire wheel speed is undergoing deceleration during the antiskid control operation in the fourth embodiment.

Next, if the wheel speed shows pulsations caused by such factors as the axial torque affected by engine fluctuations in engine speed (refer to FIG. 19), it can be derived from FIG. 19 that, $$b_n + \{Q/(W_0R)\} \cdot T = (\mu_{(n+2)(n+3)} - \mu_{(n)(n+1)}) + b_{n+1}$$

therefore, the road friction can be expressed as follows.

$$\mu_{(n+2)(n+3)} - \mu_{(n)(n+1)} = \{Q/(W_0R)\} \cdot T - (b_{n+1} - b_n)$$

Here, since $b_{n+1} > b_n$, $$\mu_{(n+2)(n+3)} - \mu_{(n)(n+1)} < \{Q/(W_0R)\} \cdot T$$

and this is equal to equation (43), it is possible to obtain the above equation (44).

In the above case, the sampling time T is set to be twice (T/2) when there are no pulsations, and when there are pulsations, sampling is made on the basis of an average value of the periods of pulsations.

If the estimated value of k calculated from the right side of equation (44) is lower than the pre-determined threshold value (for example 0), then it assumes that the value of k is less than the threshold value and the pressure reduction phase subsequent to the second increase in the pressure of the antiskid control operation is started.

The above methods of determining the timing of the second reduction in the fluid pressure are summarized in the following.

The first method is applicable to a case in which there are no pulsations in the wheel speed during the antiskid control operation. The antiskid control operation begins by applying the first pressure reduction in the wheel cylinder. Following this phase, the first pressure increase is applied so as to increase the axial control torque on the wheel axis linearly with time. The wheel motion therefore changes from acceleration to deceleration during the time interval $t_{M1}$. During this time interval $t_{M1}$, the timing of application of the second pressure reduction is calculated according to four wheel speeds, $R\omega_n$ to $R\omega_{n+3}$, measured at time intervals of T/2, and the value of k is computed from the following equation.

$$k = v \cdot \{Q/(W_0R)\} \cdot (T/2) \cdot [(R\omega_n - R\omega_{n+1}) + (R\omega_{n+2} - R\omega_{n+3}) - 2(R\omega_{n+1} - R\omega_{n+2})]/[(R\omega_n - R\omega_{n+1}) \cdot (R\omega_{n+2} - R\omega_{n+3}) - (R\omega_{n+1} - R\omega_{n+2})^2]$$

The second calculation method is applicable to a case of calculating the timing for the second pressure reduction in the fluid pressure, regardless of the presence or absence of wheel speed pulsations. Other conditions of the skid control remains the same as in the first case.

First, when there are pulsations in the wheel speed, the maximum and the minimum values in the five successive wheel speeds $R\omega_n$ to $R\omega_{n+4}$ are used in the calculation. More specifically, either the group of alternating minimum and maximum wheel speeds, $R\omega_n$, $R\omega_{n+1}$, $R\omega_{n+2}$, $R\omega_{n+3}$ and $R\omega_{n+4}$, or the other group of alternating maximum and minimum wheel speeds, $R\omega_n$, $R\omega_{n+1}$, $R\omega_{n+2}$, $R\omega_{n+3}$ and $R\omega_{n+4}$, is used to calculate the change rate k according to the following formula. When there are no pulsations, five successive wheel speeds, $R\omega_n$ to $R\omega_{n+4}$, taken at the sampling time T of T/2 are used, and if there are pulsations, then an average value of wheel speed for each of the sampling period is used. The formula is as follows.

$$k = v \cdot \{Q/(W_0R)\} \cdot (T) \cdot [(R\omega_n - R\omega_{n+4}) - 2(R\omega_{n+1} - R\omega_{n+3})]/[(R\omega_n - R\omega_{n+2}) \cdot (R\omega_{n+2} - R\omega_{n+4}) - (R\omega_{n+1} - R\omega_{n+3})^2]$$

The first method of estimating the timing of the second pressure reduction is carried out as follows, when there are no pulsations, while the other conditions of antiskid control remains the same as before.

In this case, the values of two successive wheel speed at a sampling time T/2, $R\omega n$ to $R\omega n+1$, are used in the following formula, which was shown in equation (42).

$$k < v \cdot \{Q/(W_0R)\} \cdot (T/2) \cdot \{1/(R\omega_n - R\omega_{n+1})\}$$

The second method of estimating the timing is applicable regardless of the presence of absence of wheel speed pulsations.

First, when there are pulsations in the wheel speed, the maximum and the minimum values in the four successive wheel speeds $R\omega_n$ to $R\omega_{n+3}$ are used in the calculation. More specifically, either the group of alternating minimum and maximum wheel speeds, $R\omega_n$, $R\omega_{n+1}$, $R\omega_{n+2}$, and $R\omega_{n+3}$, or the other group of alternating maximum and minimum wheel speeds, $R\omega_n$, $R\omega_{n+1}$, $R\omega_{n+2}$, and $R\omega_{n+3}$, is used to calculate an average wheel speed value of the two successive speeds, $(R\omega_{n+1} + R\omega_{n+2})/2 = R\omega_{(n)(n+1)}$ and $(R\omega_{n+2} + R\omega_{n+3})/2 = $ the $R\omega_{(n+2)(n+3)}$. Using the two average values, the change rate k is calculated according to the following formula. When there are no pulsations, successive four wheel speeds $R\omega n$ to $R\omega n+3$, taken at the sampling time T of T/2 are used, and if there are pulsations, then an average wheel speed for each of the sampling period is used. The formula, which was shown in equation (44), is as follows.

$$k < v \cdot \{Q/(W_0R)\} \cdot T \cdot \{1/(R\omega_{(n)(n+1)} - R\omega_{(n+2)(n+3)})\}$$

In the following, the operation of an antiskid control device based on the first and the second calculation methods, and the first and the second estimation methods will be explained.

Figure 20:
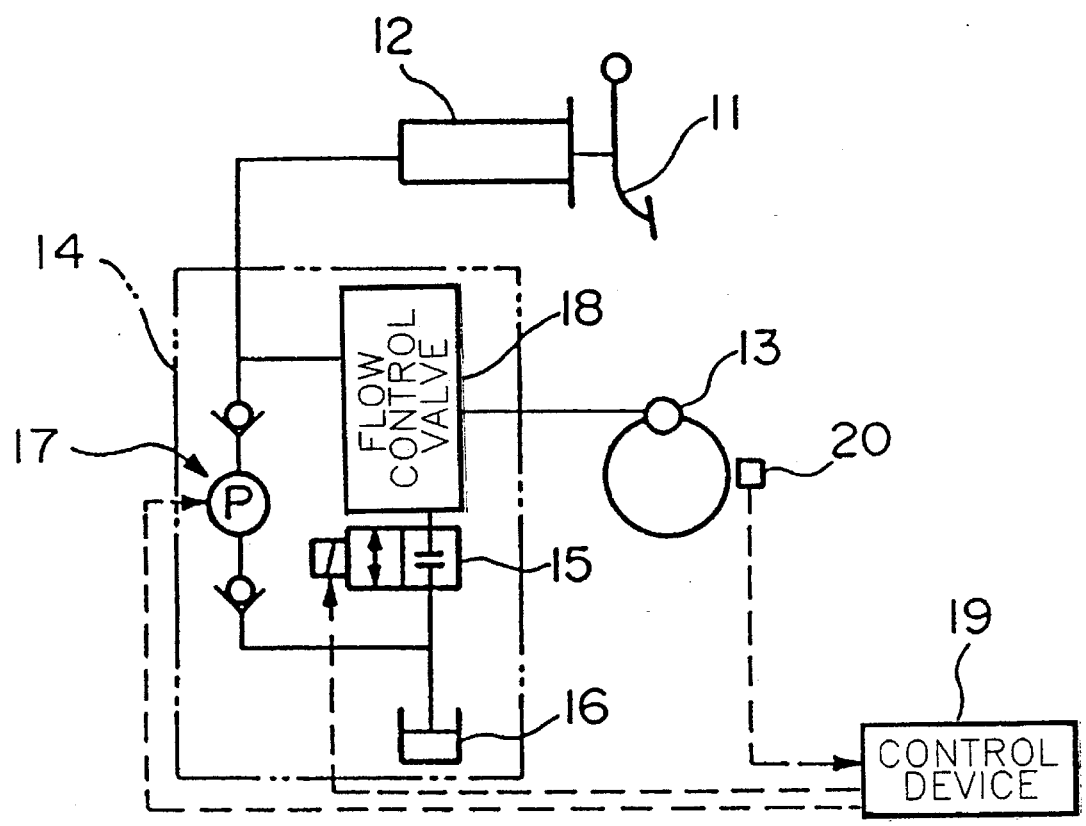
FIG. 20 is a schematic representation of the antiskid control device of the fourth embodiment.

FIG. 20 shows the brake fluid system for antiskid control of motor vehicle, comprising: a brake pedal 11; a master cylinder 12 activated by the pedal 11; a wheel cylinder 13 which control a wheel 1 by the fluid pressure transmitted from the wheel cylinder 13; and a modulator 14 disposed between the two. The wheel cylinder 13 control disk brake or drum brake, for example.

The modulator 14 comprises a normally-closed electromagnetic (n/c em) valve 15; a variable volume reservoir 16; a pump 17 which withdraws the brake fluid from the reservoir 16; and a flow control valve 18. The flow control valve 18 communicates the master cylinder 12 with the wheel cylinder 13 during the normal operation of the braking system without the antiskid control during which operation, the n/c em valve 15 is closed. During the pressure reducing phase of the antiskid operation, the n/c em valve 15 is activated, and the flow control valve 18 shuts off the communication between the master cylinder 12 and the wheel cylinder 13 while communicating the wheel cylinder 13 and the reservoir 16 so as to let the brake fluid in the wheel cylinder 13 flow into the reservoir 16. During the second increase in the pressure of the antiskid control operation while the n/c em valve 15 is closed, the flow control valve 18 allows the brake fluid discharged by the pump 17 from the reservoir 16 to flow into the wheel cylinder 13 at a constant volume rate so as to maintain the increase rate in the control brake torque at a constant value. Here, the brake fluid which was made to flow into the reservoir 16 during the pressure reducing phase of the antiskid control operation, is returned to the master cylinder 12 by the pump 17.

The n/c em valve 15 and the pump 17 are connected to a control device 19 which is provided with a wheel speed sensor 20 which detects the rotational speed of the wheel 1, and generates a pulse signal for each rotation of the wheel 1.

The operation of the control device 19 will be explained step by step with reference to a flow chart shown in FIG. 8.

At the time of the start of the antiskid control operation (i.e., the beginning of the first pressure reducing phase following the first increase in the pressure), the control device 19 computes the slipping rate or the amount of slip occurring in the wheel 1 on the basis of a wheel speed value from the wheel speed sensor 20, and decides that the wheel is tending to lock up, when the slipping rate or the amount of slip exceeds a pre-determined threshold value. Other method includes a comparison of the current condition with a previously established threshold value of the slipping rate or the amount of slip occurring in the wheel 1, and decides that the wheel is tending to lock up when the threshold value is exceeded and enters into the antiskid control operation. Other method includes a comparison of the current condition with the deceleration of the wheel 1 with a previously established threshold value, and enters into the control operation when the threshold value is exceeded. There are many variations of the methods, and these may be combined suitably.

The controller 19 also decides the first increase in the fluid pressure subsequent to the first reduction in the fluid pressure on the basis of whether the slipping rate of the amount of slip is above or below the threshold value. For example, while the wheel is in the first pressure reducing phase, and the slipping rate or the slip amount becomes lower than the threshold value, the controller 19 decides that the wheel 1 is no longer tending to lock up, and begin the first increase in the fluid pressure. On alternatively, when the wheel deceleration becomes lower than the pre-determined threshold value, the controller may decide that the lock up tendency has been averted, and begin antiskid control operation. Combination of such two methods is also applicable.

Figure 21:
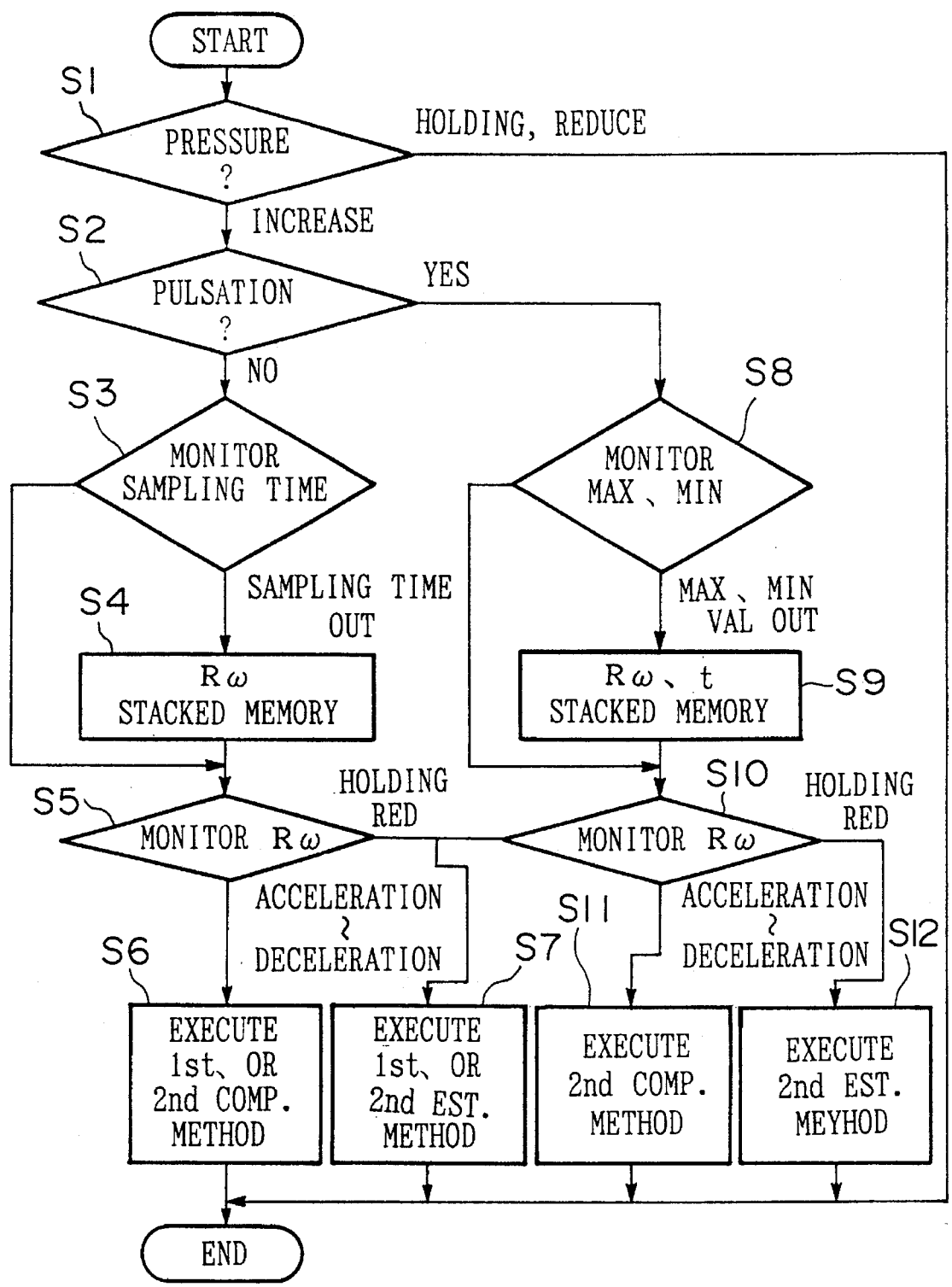
FIG. 21 is a flow chart showing the main steps for operating the antiskid control device of the fourth embodiment.

In the following, the control steps of the controller 19 will be explained, with reference to the control steps in the flow chart shown in FIG. 21.

Step S1

First, assuming that the vehicle is in the antiskid control operation, the control device 19 (henceforth referred to as it) decides whether the brake pressure in the wheel cylinder 13 is in the pressure reducing phase, pressure maintaining phase or the second pressuring phase from the data in the memory. If it decides that the system is in the second pressuring phase, it proceeds to step S2, and if it decides that the control is in the pressure reducing phase or pressure maintaining phase, it completes this step.

Step S2

It decides whether there are pulsations in the wheel speed on the basis of the output signals from the wheel speed detector 20. If there are no pulsation in the wheel speed, it proceeds to step S3, and when there are pulsations in the wheel speed, then it proceeds to step S8.

Step S3

It monitors the sampling time so as to sample the wheel speed at a constant sampling time. When the sampling time arrives, it proceeds to step S4, and if the sampling time has not arrived, it proceeds to step S5.

Step S4

Figure 22:
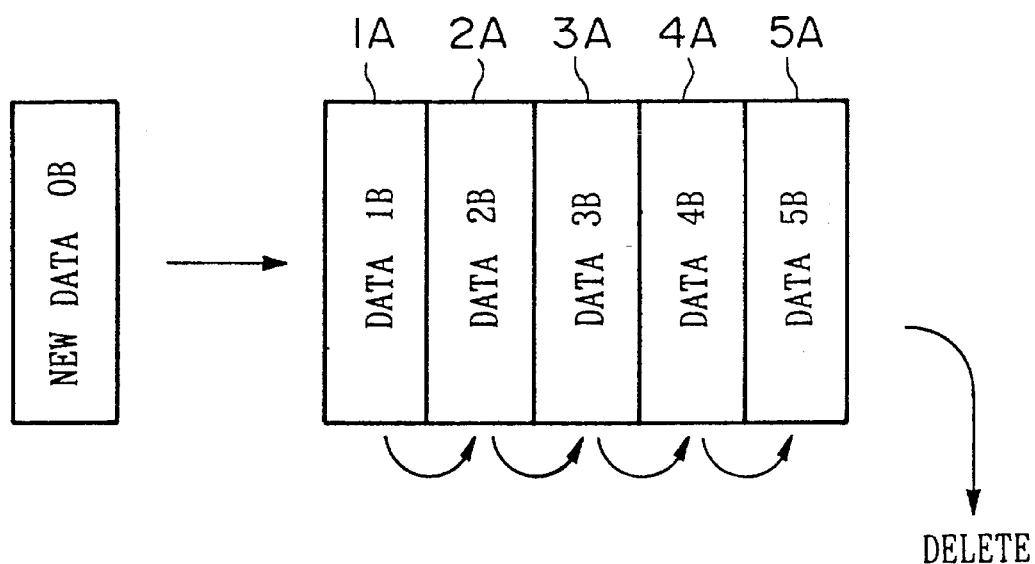
FIG. 22 is an explanation for the stacked memory for the antiskid control device of the fourth embodiment.

It memorizes the values of the wheel speeds $R\omega$ in a stacking memory. The stacking memory refers to a memory format shown in FIG. 22, in which a new data replaces the oldest data in a stacked memory cells 1A to 5A. For example in FIG. 22, the data pieces 1B to 5B are stored in the stacked memory cells 1A to 5A, respectively. When a new piece of data 0B is to be entered in the stacked memory cells, the oldest memory 5B is erased from the memory cell 5A, and the existing pieces of data 4B to 1B are transferred down successively so that 4B goes into 5A, 3B goes into 4A, 2B into 3A and 1B into 2A, thereby vacating the memory cell 1A. The new piece of data 0B is now entered into the stack memory cell 1A.

Step S5

On the basis of the signals from the wheel speed detector 20, it determines whether the wheel is a phase of changing from acceleration to deceleration, or the entire wheel system is continuing to decelerate. If it decides that the wheel is changing from acceleration to deceleration, it proceeds to step S6. If it decides that the entire wheel system is continuing to decelerate, it proceeds to step S7.

Step S6

The change rate k is calculated in accordance with either the first or the second computation method. Which computation method to be used is pre-determined, and is entered in the controller.

Step S7

The change rate k is calculated in accordance with either the first or the second estimation method. Which estimation method to be used in pre-determined, and is entered in the controller.

Step S8

On the basis of the signals from the wheel speed detector 20, it monitors the maximum values and the minimum values of the wheel speed, and it determines whether either values has been detected. When one value is detected, it proceeds to step S9, otherwise, it proceeds to step S10.

Step S9

The maximum or the minimum wheel speeds and their time of generation are memorized in the stack memory.

Step S10

On the basis of the signals from the wheel speed detector, it determines whether the wheel is in the phase of changing from acceleration to deceleration, and if it decides that the wheel is in the changing phase, it proceeds to step S11, and if it decides that the entire wheel system is continuing to remain in the deceleration phase, it proceeds to step S12.

Step S11

It performs calculation of the change rate k in accordance with the second computation method.

Step S12

It performs calculation of the change rate k in accordance with the second estimation method.

Controller 19 compares the calculated value of k with the pre-determined threshold value, and it the calculated value is lower than the threshold value, it switches the antiskid operation from the pressure increasing phase to the pressure reducing phase.

As explained above, the method of antiskid control and the device based on the control method of this embodiment are based on controlling the brake torque linearly with time. More specifically, after the first reducing phase of the fluid pressure in the wheel cylinder 13, the controlling torque is increased linearly with time, and determined the timing of application of the second pressure reduction is calculated for two cases. The first case is when there are no pulsations in the wheel speed, and the change rate k of the wheel slipping rate with respect to the road friction coefficient is obtained from the wheel speed measured at certain regular constant time intervals. When there are pulsation in the wheel speed, the maximum or minimum consecutive values of the wheel speeds are obtained, and the change rate k is calculated on the basis of these alternating maximum/minimum wheel speeds. The control action is triggered when the change rate k is lower than the threshold value. The calculations show that the course of change in the average values of the maximum/minimum wheel speeds is approximately same as that when there are no pulsations, therefore, even when there are pulsations in the wheel speeds, the second method of estimation is able to determine the change rate k without any loss of precision.

Therefore, even when the wheel speed is being changed by external factors such as the engineer problems, the rate change can be estimated. The method therefore enable the determination of the change rate k, between the slipping rate $\lambda$ and the coefficient of road friction, by means of calculation or by estimation. Therefore, the method enables not the prevention of wheel lock up, but also enable to utilize the maximum effect of the road friction, and enables to minimize the range of variation of the slipping rate $\lambda$.

Figure 23:
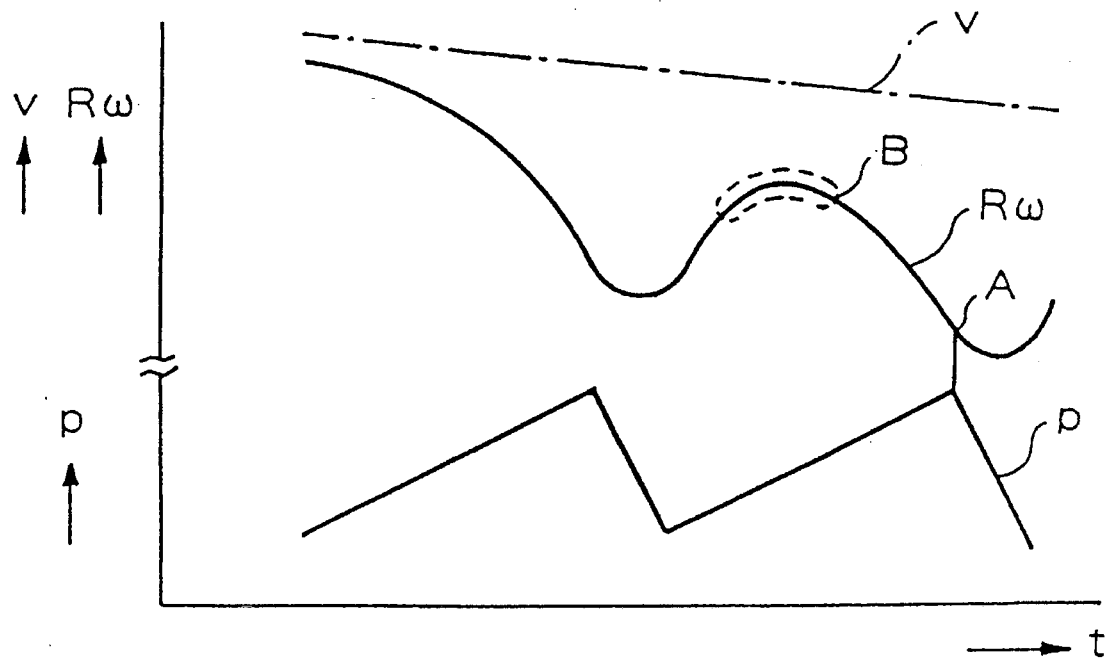
FIG. 23 shows a relationship between vehicle speed v, wheel speed Rω and the axial control torque P in a conventional antiskid control device.

It should be noted further that, as shown in FIG. 23, according to the conventional method of antiskid control in which the pressure reducing phase is started when the slipping rate exceeds the threshold value. Therefore, the control operation begins at the point A in FIG. 23. On the other hand, according to the method of the present invention, the control action is determined on the basis of the change rate k, therefore, the control action begins near the point B, thus enabling to shorten the time interval in which the vehicle is in the low cornering force Fc, shown by the dotted lines in FIG. 13. The antiskid control operation is applied to the wheel quickly to avoid the vehicle from spinning.

In the following, the control method of a fifth embodiment will be explained. In the fifth embodiment, the equations (32) or (35) in the fourth embodiment, is replaced with the following equation. When $R\omega_n = R\omega_{n+2}$, the following equation (50) is used.

$$k \approx 3v(Q/W_0R)[\frac{1}{2}\{2(R\omega_{n+1} - R\omega_n)/(T/2)\} - 1/R\omega_n'] \quad (50)$$

With this equation, the value of k can be calculated from a small number of measured points. Also, when $(R\omega_{n+1}R\omega_n)$ is nearly equal to $R\omega_p - R\omega_n$ then the above equation (50) can also be used. This will be explained below.

Figure 24:
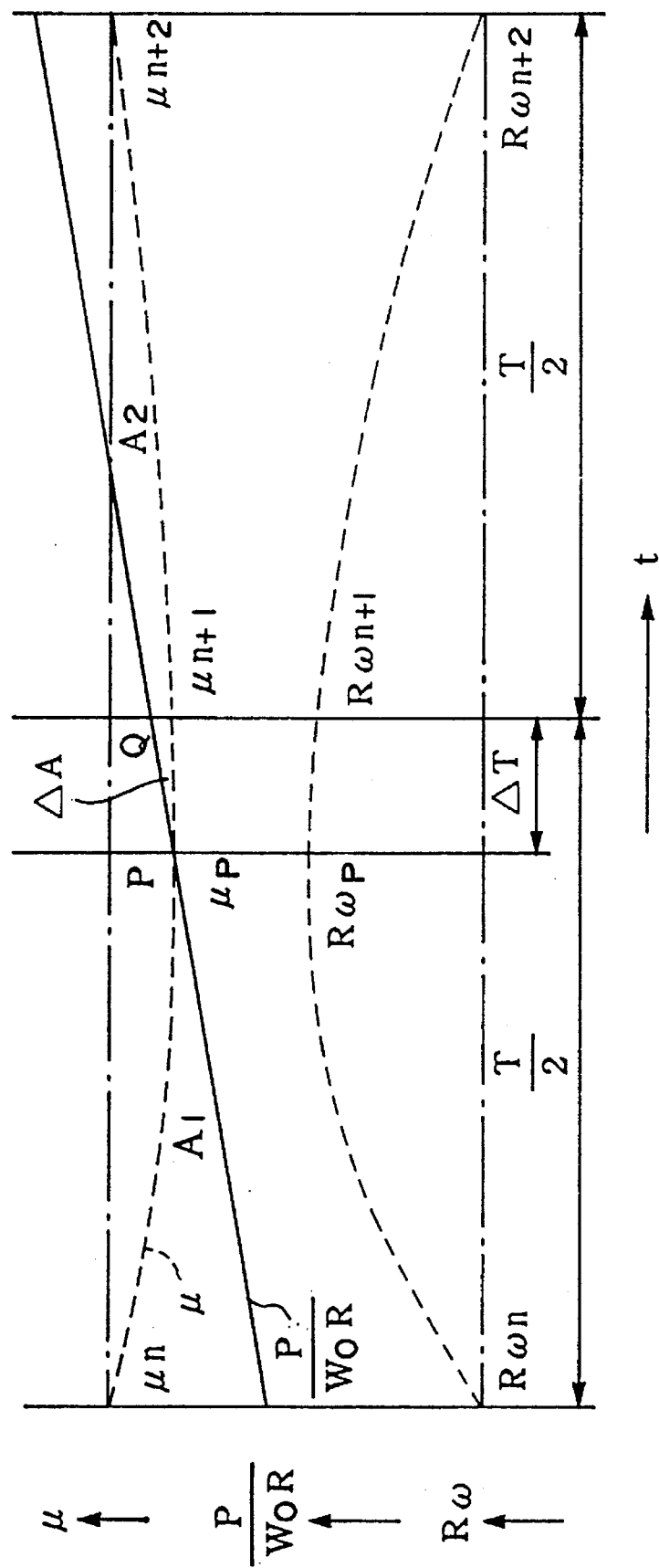
FIG. 24 shows the relationship between the wheel speed Rω without wheel speed pulsations, the coefficient of road friction and the axial control torque $P/(W_0R)$ during the control phase of the fifth embodiment of the antiskid control method in which the wheel speed is changing from acceleration to deceleration.

FIG. 24 corresponds to FIG. 15 in the fourth embodiment. In the fifth embodiment, the value of $P/W_0R$ is increasing linearly with time. It is further assumed that the parameters $(\mu-\lambda)$, k, v, $W_0$, $C_0$ are all constants.

$R\omega_n$, $R\omega_{n+1}$ and $R\omega_{n+2}$ are measured at regular intervals of F/2, and the condition of $R\omega_n = R\omega_{n+2}$ is selected.

In FIG. 24, since $\mu_n = \mu_{n+2}$ the areas A1 and A2 bounded by the $\mu$ curve and the $P/W_0R$ line are the equal.

The area A1 is calculated as follows.

The origin is taken at the point P which corresponds to the maximum wheel speed, and the axis X1 extends to the left. The curve ($\mu_n$ to $\mu_P$) are presented by y1 which is approximated with a second degree curve. Therefore, $$y_1 \approx \{(\mu_n - \mu_r)/(T/2 - \Delta T)^2\}x_1^2$$

therefore, the area A1 is given by equation (51).

$$\begin{aligned} A_1 &\approx \int_0^{T/2-\Delta T}[\{(\mu_n - \mu_r)/(T/2 - \Delta T)^2\}x_1^2 + \\ &\quad (Q/W_0R)x_1]dx_1 \\ &= (1/3)(\mu_n - \mu_r)(T/2 - \Delta T) + \\ &\quad (1/2)(Q/W_0R)(T/2 - \Delta T)^2 \end{aligned} \quad (51)$$

Next, the area A2 is calculated by taking point P at the origin and extending the axis X2 to the right. Representing ($\mu_P$ to $\mu_{n+2}$) by y2 in the following expression, $$y_2 \approx \{(\mu_n - \mu_r)/(T/2 + \Delta T)^2\}x_2^2$$

Therefore, the area A2 is given by equation (52).

$$\begin{aligned} A_2 &\approx \int_0^{T/2+\Delta T}[(Q/W_0R)x_2 - \\ &\quad \{(\mu_n - \mu_r)/(T/2 + \Delta T)^2\}x_2^2]dx_2 \\ &= (1/2)(Q/W_0R)(T/2 + \Delta T)^2 - \\ &\quad (1/3)(\mu_n - \mu_r)(T/2 + \Delta T) \end{aligned} \quad (52)$$

Since A1=A2, the quantity $(\mu_n - \mu_P)$ is calculated from equation (53) as follows.

$$(1/3)(\mu_n - \mu_{r'})(T/2 - \Delta T) + (1/2)(Q/W_0R)(T/2 - \Delta T)^2 \approx \quad (53)$$

$$-(1/3)(\mu_n - \mu_{r'})(T/2 + \Delta T) + (1/2)(Q/W_0R)(T/2 + \Delta T)^2 \therefore$$

$$(2/3)(\mu_n - \mu_{r'})(T/2) \approx 2(Q/W_0R)(T/2)\Delta T \therefore$$

$$(\mu_n - \mu_{r'}) \approx 3(Q/W_0R)\Delta T$$

The area A1 can be calculated from equation (53) as follows.

$$A_1 \approx (Q/W_0R)\Delta T(T/2 - \Delta T) + (\frac{1}{2})(Q/W_0R)(T/2 - \Delta T)^2 = (\frac{1}{2})(Q/W_0R)(T/2)^2\{1 - (\Delta T/(T/2))^2\} \quad (54)$$

By approximating the difference in area $\Delta A$ with a triangle bounded by P, Q, $\mu_{n+1}$, the following equation is obtained.

$$\Delta A \approx (\frac{1}{2})(Q/W_0R)(\Delta T)^2 = (\frac{1}{2})(Q/W_0R)(T/2)^2(\Delta T/(T/2))^2$$

therefore, the wheel speeds can be expressed by equation (55) as follows.

$$(R\omega_{n+1} - R\omega_n) = (g/C)\{(A_1 - \Delta A)\} \approx (\frac{1}{2})(g/C)(Q/W_0R(T/2)^2\{1 - 2(\Delta T/(T/2))^2\} \quad (55)$$

From equation (53) and FIG. 24, $$\begin{aligned} R\omega_n' &= (g/C)\{(Q/W_0R)(T/2 - \Delta T) + (\mu_n - \mu_r)\} \\ &\approx (g/C)(Q/W_0R)(T/2 + 2\Delta T) \\ &= (g/C)(Q/W_0R)(T/2)\{1 + 2\Delta T/(T/2)\} \end{aligned} \quad (56)$$

is obtained.

Using equations (55) and (56), $$\{2(R\omega_{n'1} - R\omega_n)/(T/2)\}/R\omega_n' \approx \quad (57)$$

$$\{1 - 2(\Delta T/(T/2))^2\}/\{1 + 2\Delta T/(T/2)\} =$$

$$1 - 2(\Delta T/(T/2))\{1 + \Delta T/(T/2)\}/\{1 + 2\Delta T/(T/2)\} \therefore$$

$$1 - \{2(R\omega_{n'1} - R\omega_n)/(T/2)\}/R\omega_n' =$$

$$2(\Delta T/(T/2))\{1 + \Delta T/(T/2)\}/\{1 + 2\Delta T/(T/2)\}$$

In the meantime, $$(R\omega_{n'1} - R\omega_n) = (v/k)(\mu_n - \mu_{n'1}) = \quad (58)$$

-continued $$(v/k)\{(\mu_n - \mu_{1'}) - (\mu_{n'1} - \mu_{1'})\} =$$

$$(v/k)(\mu_n - \mu_{1'})\{1 - (\Delta A)/(A_1)\} \approx$$

$$(v/k)\, 3\, (Q/W_oR)\Delta T[1 - (\Delta T/(T/2))^2/\{1 - (\Delta T/(T/2))^2\}]$$

therefore, $$\therefore \Delta T/(T/2) \approx (k/v)(\tfrac{1}{3})(1/Q/W_oR))\{(R\omega_{n+1} - R\omega_n)/(T/2)\}\times\{1-(\Delta T/(T/2))^2\}/\{1-2(\Delta T/(T/2))^2\}$$

Substituting the above expression in equation (57);

$$1 - \{2(R\omega_{n'1} - R\omega_n)/(T/2)\}/R\omega_n' \approx \qquad (59)$$

$$\{(k/v)(1/3)(1/(Q/W_oR))\}\{2(R\omega_{n'1} - R\omega_n)/(T/2)\} \times$$

$$[\{1 + \Delta T/(T/2)\}\{1 - (\Delta T/(T/2))^2\}/\{1 + 2\Delta T/(T/2)\}\{1 - 2(\Delta T/(T/2))^2\}]$$

The right side of equation (59) inside the bracket [] is close to 1, the following expression is valid, $$1 - \{2(R\omega_{n'1} - R\omega_n)/(T/2)\}/R\omega_n' \approx$$

$$\{(k/v)(1/3)(1/(Q/W_oR))\}\{2(R\omega_{n'1} - R\omega_n)/(T/2)\} \therefore$$

$$k \approx 3v(Q/W_oR)\,[1/\{2(R\omega_{n'1} - R\omega_n)/(T/2)\} - 1/R\omega_n']$$

thus providing equation (50).

What is claimed is:

1. A method for evaluating the operating condition of an antiskid control of a moving vehicle, wherein a wheel cylinder of said moving vehicle is subjected to a first reduction in pressure followed by a first increase in fluid pressure such that the axial control torque inclusive of the brake torque is being increased linearly with time, based on whether:

the vehicle is in a stable antiskid control operation in which the wheel of said vehicle is experiencing a slipping rate to generate a maximum friction between a road and the wheel or slightly less than said slipping rate; or the vehicle is in an unstable antiskid control operation in which the wheel of said vehicle is experiencing a slipping rate to generate said maximum friction between the road and the wheel or slightly above said slipping rate;

wherein said method comprises the steps of: memorizing a wheel speed generated at time t1 when the wheel acceleration attains a pre-determined specific value while the wheel speed of said moving vehicle is increasing; measuring the time interval between said time t1 and time t2 when the wheel speed, after going through a cycle of a wheel speed increase phase, corresponding to a decreasing of the fluid pressure, and a wheel speed decrease phase, corresponding to an increasing of the fluid pressure, again attains said pre-determined specific value; calculating a maximum value of the difference in the wheel speeds during said time interval t1 and t2; dividing said difference with a product of said pre-determined specific value and said time t1 to obtain a determinant D; comparing the determinant D with a threshold value; and deciding that the moving vehicle is in a stable antiskid control operation when said determinant D is not more than said threshold value, and deciding that the moving vehicle is in an unstable antiskid control operation when said determinant D is not less than said threshold value.

2. A method as claimed in claim 1, wherein the fluid pressure is maintained at said first increase in fluid pressure when the vehicle is determined to be in a stable antiskid control operation, and the fluid pressure is reduced when the vehicle is determined to be in an unstable antiskid control operation.

3. A method for evaluating the operating condition of an antiskid control of a moving vehicle, wherein a wheel cylinder of said moving vehicle is subjected to a first reduction in pressure followed by a first increase in fluid pressure such that the axial control torque inclusive of the brake torque is being increased linearly with time, based on whether:

the vehicle is in a stable antiskid control operation in which the wheel of said vehicle is experiencing a slipping rate to generate a maximum friction between a road and the wheel or slightly lower than said slipping rate; or the vehicle is in an unstable antiskid control operation in which the wheel of said vehicle is experiencing a slipping rate to generate said maximum friction between the road and the wheel or slightly higher than said slipping rate;

wherein said method comprises the steps of: memorizing a wheel speed generated at time t1 when the wheel acceleration attains a pre-determined specific value while the wheel speed of said moving vehicle is increasing; measuring the time interval between said time t1 and time t2 when the wheel acceleration becomes zero; calculating the difference in the wheel speeds at said time t1 and at time t2; dividing said difference with a product of said pre-determined specific value and said time t1 to obtain a determinant D; comparing the determinant D with a threshold value; and deciding that the moving vehicle is in a stable antiskid control operation when said determinant D is not more than said threshold value, and deciding that the moving vehicle is in an unstable antiskid control operation when said determinant D is not less than said threshold value.

4. A method as claimed in claim 3, wherein the fluid pressure is maintained at said first increase in the fluid pressure when the vehicle is determined to be in a stable antiskid control operation, and the fluid pressure is reduced when the vehicle is determined to be in an unstable antiskid control operation.

5. An apparatus for performing an antiskid control operation of a wheel in a moving vehicle comprising:

(a) a wheel speed detection device for determining the wheel speed of a moving vehicle;

(b) a pressure modulator for providing at least a first pressure reduction followed by a first pressure increase in a wheel cylinder;

(c) a controller for controlling the action of said pressure modulator;

wherein during the period of the operation of an antiskid control, said controller activates the pressure modulator to perform a first reduction in the fluid pressure to said wheel cylinder followed by a first increase in the fluid pressure, so as to generate a linear increase with time in the axial control torque inclusive of the brake torque, wherein during performing of said first increase in the fluid pressure, said controller provides antiskid control actions comprising the steps of:

determining the variations in the wheel speed with time based on the signals from said wheel speed detection device;

memorizing a wheel speed at time t1 when the wheel acceleration attains a specific value while said vehicle is undergoing a speed increase;

measuring the time interval between t1 and t2 when the wheel speed again reaches said memorized value of wheel speed after a temporary decrease;

calculating a maximum value of the difference in the wheel speeds at times t1 and t2; and calculating a value of a determinant D obtained by dividing the maximum value by a product between said specific value of the wheel acceleration and said time interval given by t2–t1; and deciding that the vehicle is in a stable antiskid control operation when said determinant D is not more than a threshold value and maintaining said first increase in the fluid pressure; and deciding that the vehicle is in an unstable antiskid control operation when said determinant D is not less than said threshold value and providing a second reduction in the fluid pressure.

6. An apparatus for performing an antiskid control operation of a wheel in a moving vehicle comprising:

(a) a wheel speed detection device for determining the wheel speed of a moving vehicle;

(b) a pressure modulator for providing at least a first pressure reduction followed by a first pressure increase in a wheel cylinder;

(c) a controller for controlling the action of said pressure modulator;

wherein during the period of the operation of an antiskid control, said controller activates the modulator to perform a first reduction in the fluid pressure to said wheel cylinder followed by a first increase in the fluid pressure, so as to generate a linear increase with time in the axial control torque inclusive of the brake torque, wherein during performing of said first increase in the fluid pressure, said controller provides antiskid control actions comprising the steps of:

determining the variations in the wheel speed with time based on the signals from said wheel speed detection device;

memorizing a wheel speed at time t1 when the wheel acceleration attains a specific value while said vehicle is undergoing a speed increase;

measuring the time interval between t1 and t2 when the wheel acceleration attains a value of zero;

calculating a maximum value of the difference in the wheel speeds at times t1 and t2; and calculating the value of a determinant D obtained by dividing the maximum value by a product between said specific value of the wheel acceleration and said time interval given by t2–t1; and deciding that the vehicle is in a stable antiskid control operation when said determinant D is not more than a threshold value and maintaining said first increase in the fluid pressure; and deciding that the vehicle is in an unstable antiskid control operation when said determinant D is not less than said threshold value and providing a second reduction in the fluid pressure.

7. A method for evaluating the operating condition of an antiskid control operation of a wheel in a moving vehicle by performing a first pressure reduction in a wheel cylinder operatively connected to said wheel; followed by a first pressure increase, thereby increasing the axial control torque linearly with time, inclusive of the brake torque, and following said first pressure increase, a second pressure reduction is provided on the basis of changes in the wheel slipping rate with respect to the coefficient of friction between said wheel and a road;

wherein when wheel speed pulsations are not present, said changes are calculated or estimated on the basis of a plurality of wheel speeds measured at regular time intervals, and when wheel speed pulsations are present, said changes are calculated or estimated on the basis of a plurality of successive maxima and minima in the wheel speeds.

8. An apparatus for performing an antiskid control operation of a wheel in a moving vehicle comprising:

(a) a wheel speed detection device for determining the wheel speed of a moving vehicle:

(b) a pressure modulator for providing at least a first pressure reduction followed by a first pressure increase in a wheel cylinder;

(c) a controller for controlling the action of said pressure modulator;

wherein during the period of the operation of an antiskid control, said controller activates the pressure modulator to perform a first reduction in the fluid pressure to said wheel cylinder followed by a first increase in the fluid pressure, so as to generate a linear increase with time in the axial control torque inclusive of the brake torque, and a second pressure reduction is provided on the basis of changes in the wheel slipping rate with respect to the coefficient of friction between said wheel and a road;

wherein when wheel speed pulsations are not present, said changes are calculated or estimated on the basis of a plurality of wheel speeds measured at regular time intervals, and a second pressure reduction is provided when a change in the wheel slipping rate with respect to the coefficient of friction between said wheel and a road is not more than a threshold value; and wherein when wheel speed pulsations are present, said changes are calculated or estimated on the basis of a plurality of successive maxima and minima in the wheel speeds, and a second pressure reduction is provided when changes in the wheel slipping rate with respect to the coefficient of friction between said wheel and the road is not less than said threshold value.

9. A method for performing an antiskid control operation of a wheel in a moving vehicle by performing a first pressure reduction in a wheel cylinder operatively connected to said wheel; followed by a first pressure increase, thereby increasing the axial control torque linearly with time, inclusive of the brake torque, and following said first pressure increase, a second pressure reduction is provided on the basis of changes in the wheel slipping rate with respect to coefficient of friction between said wheel and a road;

wherein when wheel speed pulsations are not present, said changes are calculated or estimated on basis of a plurality of wheel speeds measured at regular time intervals and a wheel speed acceleration calculated on the basis of at least one of said plurality of wheel speeds, and when wheel speed pulsations are present, said changes are calculated or estimated on the basis of a plurality of successive maxima and minima in the wheel speeds.

10. An apparatus for performing an antiskid control operation of a wheel in a moving vehicle comprising:

(a) a wheel speed detection device for determining the wheel speed of a moving vehicle;

(b) a pressure modulator for providing at least a first pressure reduction followed by a first pressure increase in a wheel cylinder;

(c) a controller for controlling the action of said pressure modulator;

wherein during the period of operation of an antiskid control, said controller activates the pressure modulator to perform a first reduction in the fluid pressure to said wheel cylinder followed by a first increase in the fluid pressure, so as to generate a linear increase with time in the axial control torque inclusive of the brake torque, and a second pressure reduction is provided on the basis of changes in the wheel slipping rate with respect to the coefficient of friction between said wheel and a road;

wherein when wheel speed pulsations are not present, said changes are calculated or estimated on the basis of a plurality of wheel speeds measured at regular time intervals and a wheel speed acceleration calculated on basis of at least one of said plurality of wheel speeds, and a second pressure reduction is provided when a change in the wheel slipping rate with respect to the coefficient of friction between said wheel and a road is not more than a threshold value; and wherein when wheel speed pulsations are present, said changes are calculated or estimated on the basis of a plurality of successive maxima and minima in the wheel speeds, and a second pressure reduction is provided when changes in the wheel slipping rate with respect to the coefficient of friction between said wheel and the road is not less than said threshold value.

* * * * *